United States Patent
Sharifi et al.

(10) Patent No.: US 10,311,249 B2
(45) Date of Patent: Jun. 4, 2019

(54) SELECTIVELY OBSCURING PRIVATE INFORMATION BASED ON CONTEXTUAL INFORMATION

(71) Applicant: Google Inc., Mountain View, CA (US)

(72) Inventors: Matthew Sharifi, Kilchberg (CH); Jakob Nicolaus Foerster, Oxford (GB)

(73) Assignee: Google LLC, Mountain View, CA (US)

(*) Notice: Subject to any disclaimer, the term of this patent is extended or adjusted under 35 U.S.C. 154(b) by 233 days.

(21) Appl. No.: 15/476,392

(22) Filed: Mar. 31, 2017

(65) Prior Publication Data

US 2018/0285592 A1    Oct. 4, 2018

(51) Int. Cl.
*G06F 21/62* (2013.01)
*G06F 21/84* (2013.01)
(Continued)

(52) U.S. Cl.
CPC .......... *G06F 21/6245* (2013.01); *G06F 21/35* (2013.01); *G06F 21/50* (2013.01);
(Continued)

(58) Field of Classification Search
CPC .......... G06F 21/34–21/35; G06F 21/50; G06F 21/60; G06F 21/6245–21/6254; G06F 21/84; G06F 2221/032
See application file for complete search history.

(56) References Cited

U.S. PATENT DOCUMENTS 5,493,692 A    2/1996    Theimer et al.
6,466,232 B1   10/2002   Newell et al.
(Continued)

FOREIGN PATENT DOCUMENTS

CN    102461096 A    5/2012
CN    103379221 A    10/2013
(Continued)

OTHER PUBLICATIONS

Introducing the Meteor Your Voice and Gesture-Controlled Smartwatch, Two-Way Voice & Gesture Control Communicator, Kreyos—The Meteor smart watch, downoaded from https://kreyos.com/, downloaded on Jun. 3, 2014, 8 pp.
(Continued)

*Primary Examiner* — Kevin Bechtel
(74) *Attorney, Agent, or Firm* — Shumaker & Sieffert, P.A.

(57) ABSTRACT

A method includes determining, based at least in part on a type of information to be displayed at a display device associated with a computing device, a privacy level for the information to be displayed; and determining whether the privacy level satisfies a threshold privacy level. The method also includes, responsive to determining that the privacy level satisfies the threshold privacy level, determining whether an individual not associated with a currently active user account of the computing device is proximate to the display device. The method also includes determining an estimated speed of the individual not associated with the currently active user account relative to the display device. The method further includes determining, whether the estimated speed satisfies a threshold speed, and responsive to determining that the estimated speed satisfies the threshold speed, outputting the information such that at least a first portion of the information is obscured.

19 Claims, 6 Drawing Sheets

(51) Int. Cl.
*G06F 21/50* (2013.01)
*G06F 21/35* (2013.01)

(52) U.S. Cl.
CPC .......... *G06F 21/6254* (2013.01); *G06F 21/84* (2013.01); *G06F 2221/032* (2013.01)

(56) References Cited

U.S. PATENT DOCUMENTS

| | | |
|---|---|---|
| 6,513,046 B1 | 1/2003 | Abbott, III et al. |
| 6,529,209 B1 | 3/2003 | Dunn |
| 6,597,328 B1 | 7/2003 | Stern et al. |
| 6,747,675 B1 | 6/2004 | Abbott et al. |
| 6,791,580 B1 | 9/2004 | Abbott et al. |
| 6,801,223 B1 | 10/2004 | Abbott et al. |
| 6,812,937 B1 | 11/2004 | Abbott et al. |
| 6,842,877 B2 | 1/2005 | Robarts |
| 6,874,127 B2 | 3/2005 | Newell et al. |
| 6,920,616 B1 | 7/2005 | Abbott et al. |
| 6,968,333 B2 | 11/2005 | Abbott et al. |
| 7,055,101 B2 | 5/2006 | Abbott et al. |
| 7,073,129 B1 | 7/2006 | Robarts |
| 7,076,737 B2 | 7/2006 | Abbott et al. |
| 7,080,322 B2 | 7/2006 | Abbott et al. |
| 7,107,539 B2 | 9/2006 | Abbott et al. |
| 7,180,502 B2 | 2/2007 | Marvit et al. |
| 7,184,025 B2 | 2/2007 | Williams et al. |
| 7,225,229 B1 | 5/2007 | Abbott et al. |
| 7,231,439 B1 | 6/2007 | Abbott et al. |
| 7,636,779 B2 | 12/2009 | Hayashi et al. |
| 7,974,656 B2 | 7/2011 | Hara et al. |
| 8,131,848 B1 | 3/2012 | Denise |
| 8,344,998 B2 | 1/2013 | Fitzgerald et al. |
| 8,502,780 B1 | 8/2013 | Park |
| 8,515,505 B1 | 8/2013 | Pattikonda |
| 8,538,158 B1 | 9/2013 | Denise |
| 8,600,120 B2 | 12/2013 | Gonion et al. |
| 8,781,452 B2 | 7/2014 | Raghavan |
| 8,784,271 B2 | 7/2014 | Brumback et al. |
| 8,811,951 B1 | 8/2014 | Faaborg et al. |
| 8,847,985 B2 | 9/2014 | Kocjan et al. |
| 8,856,948 B1 | 10/2014 | Robison et al. |
| 8,934,719 B1 | 1/2015 | Denise |
| 8,955,147 B2 | 2/2015 | Lee et al. |
| 9,372,997 B2 | 6/2016 | Robison et al. |
| 9,497,309 B2 | 11/2016 | Raghavan |
| 9,898,610 B1* | 2/2018 | Hadsall ............... G06F 21/6245 |
| 2004/0017926 A1 | 1/2004 | Tonisson |
| 2004/0078596 A1 | 4/2004 | Larry, Jr. et al. |
| 2005/0066282 A1 | 3/2005 | Abbott et al. |
| 2005/0086243 A1 | 4/2005 | Abbott et al. |
| 2005/0136837 A1 | 6/2005 | Nurminen et al. |
| 2006/0052091 A1 | 3/2006 | Onyon |
| 2006/0064384 A1* | 3/2006 | Mehrotra ............... G01S 3/7864 705/57 |
| 2006/0093998 A1 | 5/2006 | Vertegaal |
| 2007/0067852 A1 | 3/2007 | James |
| 2007/0089067 A1 | 4/2007 | Abbott et al. |
| 2008/0055194 A1 | 3/2008 | Baudino et al. |
| 2008/0255795 A1 | 10/2008 | Shkolnikov |
| 2008/0307341 A1 | 12/2008 | Ferry et al. |
| 2008/0318616 A1 | 12/2008 | Chipalkatti et al. |
| 2009/0195497 A1 | 8/2009 | Fitzgerald et al. |
| 2009/0265671 A1 | 10/2009 | Sachs et al. |
| 2009/0311999 A1 | 12/2009 | Sarkar et al. |
| 2010/0056113 A1 | 3/2010 | Silverman |
| 2010/0076926 A1 | 3/2010 | Lecciso et al. |
| 2010/0097310 A1 | 4/2010 | Lee et al. |
| 2010/0151887 A1 | 6/2010 | Bobier |
| 2010/0205667 A1 | 8/2010 | Anderson et al. |
| 2010/0255822 A1 | 10/2010 | Celik |
| 2010/0275266 A1 | 10/2010 | Jakobson et al. |
| 2010/0304766 A1 | 12/2010 | Goyal |
| 2011/0177802 A1 | 7/2011 | Gupta |
| 2011/0202850 A1 | 8/2011 | Chan et al. |
| 2011/0241983 A1 | 10/2011 | Chang |
| 2011/0321143 A1 | 12/2011 | Angaluri et al. |
| 2012/0026274 A1 | 2/2012 | Baker et al. |
| 2012/0062445 A1 | 3/2012 | Haddick et al. |
| 2012/0088548 A1 | 4/2012 | Yun et al. |
| 2012/0092436 A1 | 4/2012 | Pahud et al. |
| 2012/0131471 A1 | 5/2012 | Terlouw et al. |
| 2012/0200601 A1 | 8/2012 | Osterhout et al. |
| 2012/0254646 A1 | 10/2012 | Lin |
| 2012/0297226 A1 | 11/2012 | Mucignat et al. |
| 2012/0314852 A1 | 12/2012 | Suri et al. |
| 2013/0069978 A1 | 3/2013 | Tanaka et al. |
| 2013/0151620 A1 | 6/2013 | Deshpande et al. |
| 2013/0156331 A1 | 6/2013 | Kurabayashi et al. |
| 2013/0172004 A1 | 7/2013 | Bahl et al. |
| 2013/0222270 A1 | 8/2013 | Winkler et al. |
| 2013/0222271 A1 | 8/2013 | Alberth et al. |
| 2013/0234924 A1 | 9/2013 | Janefalkar et al. |
| 2013/0249785 A1 | 9/2013 | Alameh |
| 2013/0276061 A1 | 10/2013 | Chebiyyam et al. |
| 2013/0278484 A1 | 10/2013 | Hwang et al. |
| 2013/0300687 A1 | 11/2013 | Park |
| 2013/0304817 A1 | 11/2013 | Hu et al. |
| 2013/0307870 A1 | 11/2013 | Ashbrook |
| 2013/0316687 A1 | 11/2013 | Subbaramoo et al. |
| 2014/0019873 A1 | 1/2014 | Gupta et al. |
| 2014/0087685 A1 | 3/2014 | Kellond et al. |
| 2014/0129231 A1 | 5/2014 | Herring et al. |
| 2014/0135036 A1 | 5/2014 | Bonanni et al. |
| 2014/0321335 A1 | 10/2014 | Lin |
| 2014/0344948 A1 | 11/2014 | Hayato et al. |
| 2015/0186092 A1 | 7/2015 | Francis et al. |
| 2016/0188973 A1* | 6/2016 | Ziaja ..................... G06F 21/84 382/116 |

FOREIGN PATENT DOCUMENTS

| | | |
|---|---|---|
| EP | 1276037 A2 | 1/2003 |
| EP | 2958020 A1 | 12/2015 |
| WO | 2000036493 A1 | 6/2000 |
| WO | 2006120211 A1 | 11/2006 |
| WO | 2013029233 A1 | 3/2013 |
| WO | 2013057048 A1 | 4/2013 |

OTHER PUBLICATIONS

Parallax, Inc., "How Does the Ping))) Sensor Work?" Chapter 1: Detect Distance with the Ping))) Ultrasonic Detector, Sep. 28, 2012, Parallax Inc. 2005, 5 pp.

Arthur et al. "Privacy-aware shared UI toolkit for nomadic environments", Software—Practice and Experience, 2011. 28 pgs.

Huang et al. "Semi-Public Displays for Small, Co-located Groups", CHI 2003: New Horizons, vol. No. 5, Issue No. 1, pp. 49-56.

Shanklin, "Review: Pebble smartwatch", gizmag [online]. Sep. 8, 2013. Retrieved from the Internet: <http://www.gizmag.com/pebble-watch-review/28990/> 11 pgs.

Horowitz, "Hide SMS & iMessage Previews from the Lock Screen on iPhone", OSXDaily [online]. Jul. 10, 2012. Retrieved from the Internet: <http://osxdaily.com/2012/07/10/hide-sms-imessage-previews-from-the-lock-screen-on-phone/> 4 pgs.

Shah, "Casio G-SHOCK with High Brightness LED automatically illuminates the display when the user tilts the watch toward the eyes to check the time", FAREASTGIZMOS [online]. Aug. 23, 2010. Retrieved from the Internet: <http://fareastgizmos.com/other_stuffcasio_gshock_with_high_brightness_led_automatically_illuminates_the_display_when_the_user_tilts_the_watch_toward_the_eye.php> 3 pgs.

U.S. Appl. No. 15/476,430, filed by Sharifi et al., filed Mar. 31, 2017.

* cited by examiner

FIG. 4A

From: Doc Brown    n/a    — 402
Marty, Your test results came back. Call me. Good news is its not Parkinson's. PS - Can I get my Delorean back now that you've got a new car?
— 414A
— 404

To: Robert Barkur    RE: CONGRATULATIONS!
Bob, I had tons of fun on your show. Please deliver my new car to: 1234 Dreamers Lane, Omaha NE, 12345.
— 406

From: Jenny (Wife)    RE: Info for car insurance  — 408
We won?! Yay!! My social security number is 123-45-678, my cell is 867-5309, and my income last year was $51,939.
— 410
— 412

Private information will be obscured in 3 seconds....
— 462

FIG. 4B

From: Doc Brown    n/a    — 402
Marty,        Call me.        PS - Can I get my Delorean back now that you've got a new car?
— 414B
— 404

To: Robert Barkur    RE: CONGRATULATIONS!
Bob, I had tons of fun on your show. Please deliver my new car to: Omaha NE, 12345.
— 406

From: Jenny (Wife)    RE: Info for car insurance  — 408
We won?! Yay!! My social security number is XXX-XX-XXX, my cell is YYY-YYYY, and my income last year was $51,ZZZ.
— 410
— 412

SELECTIVELY OBSCURING PRIVATE INFORMATION BASED ON CONTEXTUAL INFORMATION

BACKGROUND

Computing devices may be used in public and private settings to consume public and private information. Outputting private information may enable individuals other than the user of the computing device to consume the private information. Some computing devices include privacy screens physically placed on top of a display to prevent individuals other than the current user of the computing device from being able to see information output by the display. However, individuals other than the user of the computing device may still be able to view private information displayed by such computing devices and such privacy screens may not be practical for various mobile and/or wearable devices.

SUMMARY

Techniques of this disclosure may enable a computing device to selectively display or obscure private information output by the computing device. The computing device may determine whether information to be output to a current user of the computing device is private and whether any individuals other than the current user of the computing device are nearby. If someone is nearby and the person's estimated speed relative to the display device and/or the computing device is less than a threshold speed, the person may be able to consume private information output by the computing device if the private information is not obscured. In such instances, rather than simply outputting the private information, the computing device may obscure (e.g., conceal or obfuscate) at least a portion of the information in such a way that may reduce the likelihood of the person being able to consume the private information. In this way, techniques of this disclosure may enable a computing device to selectively obscure private information to reduce or eliminate the ability of individuals other than the current user to consume the private information.

In one example, the disclosure describes a method that includes determining, by one or more processors, based at least in part on a type of information to be displayed at a display device associated with a computing device, a privacy level for the information to be displayed, and determining, by the one or more processors, whether the privacy level satisfies a threshold privacy level. The method includes, responsive to determining that the privacy level satisfies the threshold privacy level: determining, by the one or more processors, based on sensor data generated by at least one sensor associated with the computing device, whether an individual not associated with a currently active user account of the computing device is proximate to the display device. The method also includes, responsive to determining the individual not associated with the currently active user account is proximate to the display device: determining, by the one or more processors, based at least in part on the sensor data, an estimated speed of the individual not associated with the currently active user account relative to the display device, and determining, by the one or more processors, whether the estimated speed satisfies a threshold speed. The method further includes responsive to determining that the estimated speed satisfies the threshold speed, outputting, by the one or more processors, for display at the display device, the information such that at least a first portion of the information is obscured.

In another example, the disclosure describes a computing device that includes at least one processor and a memory. The memory includes instructions that, when executed by the at least one processor, cause the at least one processor to: determine, based at least in part on a type of information to be displayed at a display device associated with the computing device, a privacy level for the information to be displayed, and determine whether the privacy level satisfies a threshold privacy level. The instructions also cause the at least one processor to, responsive to determining that the privacy level satisfies the threshold privacy level: determine, based on sensor data generated by at least one sensor associated with the computing device, whether an individual not associated with a currently active user account of the computing device is proximate to the display device. The instructions also cause the at least one processor to, responsive to determining the individual not associated with the currently active user account is proximate to the display device: determine, based at least in part on the sensor data, an estimated speed of the individual not associated with the currently active user account relative to the display device, and determine whether the estimated speed satisfies a threshold speed. The instructions further cause the at least one processor to: responsive to determining that the estimated speed satisfies the threshold speed, output, for display at the display device, the information such that at least a first portion of the information is obscured; and responsive to determining that the estimated speed does not satisfy the threshold speed, output, for display at the display device, the information.

In another example, the disclosure describes a non-transitory computer-readable storage medium encoded with instructions that, when executed by at least one processor of a computing device, cause the at least one processor to: determine, based at least in part on a type of information to be displayed at a display device associated with the computing device, a privacy level for the information to be displayed; and determine whether the privacy level satisfies a threshold privacy level. The instructions also cause the at least one processor to, responsive to determining that the privacy level satisfies the threshold privacy level: determine, based on sensor data generated by at least one sensor associated with the computing device, whether an individual not associated with a currently active user account of the computing device is proximate to the display device. The instructions also cause the at least one processor to, responsive to determining the individual not associated with the currently active user account is proximate to the display device: determine, based at least in part on the sensor data, an estimated speed of the individual not associated with the currently active user account relative to the display device; and determine whether the estimated speed satisfies a threshold speed. The instructions further cause the at least one processor to, responsive to determining that the estimated speed satisfies the threshold speed, output, for display at the display device, the information such that at least a first portion of the information is obscured; and responsive to determining that the estimated speed does not satisfy the threshold speed, output, for display at the display device, the information.

In yet another example, the disclosure describes a system that includes means for determining, based at least in part on a type of information to be displayed at a display device associated with a computing device, a privacy level for the information to be displayed; and means for determining, whether the privacy level satisfies a threshold privacy level. The system also includes means for, responsive to determining that the privacy level satisfies the threshold privacy level, determining, based on sensor data generated by at least one sensor associated with the computing device, whether an individual not associated with a currently active user account of the computing device is proximate to the display device. The system also includes means for determining, based at least in part on the sensor data, an estimated speed of the individual not associated with the currently active user account relative to the display device; and means for determining, whether the estimated speed satisfies a threshold speed, The system further includes means for, responsive to determining that the estimated speed satisfies the threshold speed, outputting, for display at the display device, the information such that at least a first portion of the information is obscured.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 4A-4C are conceptual diagrams illustrating example graphical user interfaces that include selectively obscured private information, in accordance with one or more aspects of the present disclosure.

DETAILED DESCRIPTION

Figure 1:
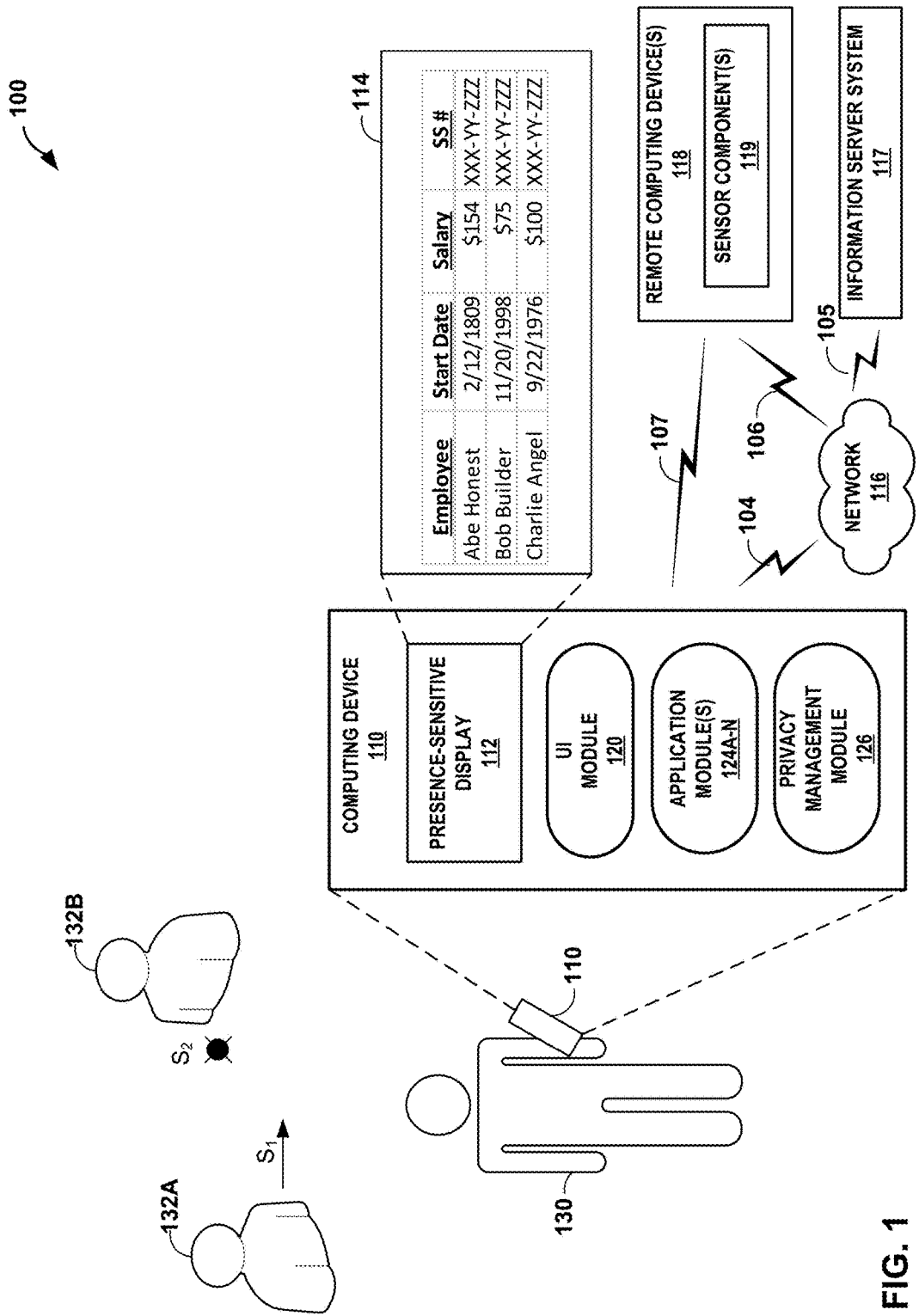
FIG. 1 is a conceptual diagram illustrating an example system that selectively obscures private information, in accordance with one or more aspects of the present disclosure.

FIG. 1 is a conceptual diagram illustrating an example system that selectively obscures private information, in accordance with one or more aspects of the present disclosure. System 100 may include computing device 110, information server system (ISS) 117, and one or more remote computing devices 118 that are communicatively coupled to computing device 110 via network 116 and/or direct link 107.

Remote computing devices 118 are one example of a computing device, such as a smartphone, a computerized wearable device (e.g., a watch, eyewear, ring, necklace, etc.), speaker, television, or any other type of computing device configured to send and receive information via a network, such as network 116. Remote computing device 118 may include one or more sensor components 119. Sensor components 119 may include optical image sensors (e.g., a camera), audio sensors (e.g., a microphone), position and/or movement sensors (e.g., an accelerometer or GPS device), or any other type of sensor. Sensor components 119 may generate sensor data (e.g., image data, audio data, movement data, etc.) which remote computing device 118 may send to computing device 110 and/or ISS 117.

Remote computing device 118 may exchange information with computing device 110 via network 116. For example, remote computing device 118 may send information, such as sensor data generated by sensor components 119, to computing device 110 and may receive information from computing device 110. Remote computing device 118 may also exchange information with computing device 110 without traversing network 116, for example, using direct link 107. Direct link 107 may be any communication protocol or mechanism capable of enabling two computing devices to communicate directly (i.e., without requiring a network switch, hub, or other intermediary network device), such as Bluetooth®, Wi-Fi Direct®, near-field communication, etc.

ISS 117 represents any suitable remote computing system, such as one or more desktop computers, laptop computers, mainframes, servers, cloud computing systems, etc. capable of sending and receiving information via a network, such as network 116. ISS 117 may host applications and data for contextual information, music, weather information, traffic information, messaging information (e.g., email, text messages), calendar information, social media, news information, etc. ISS 117 may represent a cloud computing system that provides information to computing device 110 via network 116, such that computing device 110 may output at least a portion of the information provided by ISS 117 to a user.

Network 116 represents any public or private communications network, for instance, cellular, Wi-Fi, and/or other types of networks, for transmitting data between computing systems, servers, and computing devices. Network 116 may include one or more network hubs, network switches, network routers, or any other network equipment, that are operatively inter-coupled thereby providing for the exchange of information between computing device 110, ISS 117, and remote computing devices 118. Computing device 110, ISS 117, and remote computing devices 118 may send and receive data via network 116 using any suitable communication techniques. Computing device 110, ISS 117, and remote computing devices 118 may send and receive data via different types of networks 116. For example, ISS 117 may exchange data with computing device 110 via a cellular network and computing device 110 may exchange data with remote computing device 118 via Wi-Fi.

Computing device 110, ISS 117, and remote computing device 118 may each be operatively coupled to network 116 using respective network links 104, 105, and 106. Computing device 110, ISS 117, and remote computing device 118 may be operatively coupled to network 116 using different network links. The links coupling computing device 110, ISS 117, and remote computing device 118 to network 116 may be Ethernet, ATM or other types of network connections, and such connections may be wireless and/or wired connections.

Computing device 110 may represent a mobile device, such as a smart phone, a tablet computer, a laptop computer, computerized watch, computerized eyewear, computerized gloves, or any other type of portable computing device. Additional examples of computing device 110 include other mobile and non-mobile devices, such as desktop computers, televisions, personal digital assistants (PDA), portable and non-portable gaming systems, digital media players or micro-consoles, e-book readers, mobile television platforms, automobile navigation and entertainment systems, vehicle cockpit displays, or any other types of wearable and non-wearable, mobile or non-mobile computing devices.

Computing device 110 includes a presence-sensitive display (PSD) 112, user interface (UI) module 120, one or more application modules 124A-N (collectively, "application modules 124"), and privacy management module (PMM) 126. Modules 120, 124, and 126 may perform operations described using software, hardware, firmware, or a mixture of hardware, software, and firmware residing in and/or executing at computing device 110. Computing device 110 may execute modules 120, 124, and 126 with multiple processors or multiple devices. Computing device 110 may execute modules 120, 124, and 126 as virtual machines executing on underlying hardware. Modules 120, 124, and 126 may execute as one or more services of an operating system or computing platform. Modules 120, 124, and 126 may execute as one or more executable programs at an application layer of a computing platform.

PSD 112 of computing device 110 may function as respective input and/or output devices for computing device 110. PSD 112 may be implemented using various technologies. For instance, PSD 112 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110.

PSD 112 may receive tactile input from a user of respective computing device 110. PSD 112 may receive indications of tactile input by detecting one or more gestures from a user (e.g., the user touching or pointing to one or more locations of PSD 112 with a finger or a stylus pen). PSD 112 may output information to a user as a user interface (e.g., graphical user interface 114), which may be associated with functionality provided by computing device 110. For example, PSD 112 may display various user interfaces related to an application or other features of computing platforms, operating systems, applications, and/or services executing at or accessible from computing device 110.

UI module 120 manages user interactions with PSD 112 and other components of computing device 110. For example, UI module 120 may cause PSD 112 to display a user interface as a user of computing device 110 views output and/or provides input at PSD 112. UI module 120 may receive one or more indications of input from a user as the user interacts with the user interfaces (e.g., PSD 112). UI module 120 may interpret inputs detected at PSD 112 and may relay information about the detected inputs to one or more associated platforms, operating systems, applications, and/or services executing at computing device 110, for example, to cause computing device 110 to perform functions. For instance, UI module 120 may cause PSD 112 to display graphical user interface 114.

UI module 120 may receive information and instructions from one or more associated platforms, operating systems, applications, and/or services executing at computing device 110 and/or one or more external computing systems (e.g., remote computing device 118). In addition, UI module 120 may act as an intermediary between the one or more associated platforms, operating systems, applications, and/ or services executing at computing device 110, various output devices of computing device 110 (e.g., speakers, LED indicators, audio or electrostatic haptic output device, etc.) to produce output (e.g., a graphic, a flash of light, a sound, a haptic response, etc.) with computing device 110.

Application modules 124 represent various individual applications and services that may be executed by computing device 110. Examples of application modules 124 include a mapping or navigation application, a calendar application, an assistant or prediction engine, a search application, a social media application, a game application, an e-mail application, a messaging application, an Internet browser application, an office productivity application (e.g., a word processing application, a spreadsheet application, a presentation application, etc.), a keyboard application, or any other application that may execute at computing device 110. In some examples, a particular application module of application modules 124 (e.g., application module 124A) may receive information (e.g., stored locally at computing device 110, stored remotely at ISS 117, and/or stored remotely at a remote computing device 118) and may cause PSD 112 to display the information. In some instances, application module 124A may output the information to UI module 120, which may generate a graphical user interface that includes the information, such that UI module 120 may cause PSD 112 to output the information, regardless of whether any of the information is private.

Rather than automatically outputting information which a user 130 of computing device 110 may not want other individuals to see, hear, or otherwise consume (e.g., private information), techniques of this disclosure may enable computing device 110 to determine whether the information includes private information and whether an individual other than the active user 130 might consume the information and, if the other individual may be able to consume the information, to obscure at least the private portions of the information when outputting the information (e.g., visual output, audio output, etc.). For example, PMM 126 may receive information to be output at a display device, determine whether information is private and/or determine respective privacy levels for various portions of the information, determine whether an individual other than the active user 130 of computing device 110 may consume the private information and, if so, cause computing device 110 to obscure at least a portion of the private information when outputting the information.

PMM 126 may analyze information (e.g., incoming communications, calendar events, application data for a currently executing application, etc.) and determine whether the information includes private information. Private information, as used in this disclosure, includes any information that a user of a device would prefer not to be shared with other persons. Public, or non-private, information, as used in this disclosure, includes any information other than private information. PMM 126 may only collect, store, or make use of a user's personal information and/or information associated with computing device 110 if the user affirmatively consents to such use of information. PMM 126 may further provide opportunities for the user to withdraw consent and in which case, PMM 126 may cease collecting, storing, or otherwise retaining the information associated with computing device 110 and/or the user of computing device 110.

PMM 126 may determine a privacy level for all or various portions of the information to be displayed and compare the privacy level to a threshold privacy level. In some examples, the privacy level is bucketed (e.g., private or non-private; or non-private, semi-private, or very private). In some examples, the privacy level may be rated on a sliding scale (e.g., 0-100). PMM 126 may determine the privacy level based at least in part on a type of information to be displayed. In some instances, the type of information may be based on an application module 124 associated with the information, a data structure or format of the information, or the content of the information. In some examples, the information to be displayed by GUI 114 may include employee name, employee start date, salary, and social security number. In these examples, IPM 230 may assign a privacy level of "very private" for the social security information, a privacy level of "semi-private" for the salary information, and a privacy level of "non-private" for the start date.

While PMM 126 is described as determining whether the information includes private information, in some instances ISS 117 may determine whether the information includes private information and may provide computing devices 110 an indication of a privacy level for the information. For example, ISS 117 may store information (e.g., emails, web-based documents) and may send the information and an indication of the privacy level for the information to computing device 110.

PMM 126 may determine whether the privacy level for the information to be output satisfies a threshold privacy level. In some examples, the privacy level for the information satisfies the threshold privacy level when the privacy level is greater than or equal to the threshold privacy level. The threshold privacy level may be a single value (e.g., 70 on a scale of 0 to 100) or may vary. In some instances, the threshold privacy level may vary based on a location of the computing device. For instance, the location may be a specific location (e.g. particular GPS coordinates) or a type of location (e.g., library, coffee shop, home, etc.). PMM 126 may determine the threshold privacy level equals a first value (e.g., 90 out of 100) at a particular location (e.g., home) and a second value (e.g., 40 out of 100) at a different location (e.g., coffee shops). Thus, in these examples, if PMM 126 determines the privacy level for the information is 60 out of 100, PMM 126 may determine that the privacy level satisfies (e.g., is greater than) the threshold privacy level when computing device 110 is located at a coffee shop, but that the privacy level does not satisfy (e.g., is less than) the threshold privacy level when computing device 110 is located at the home of user 130.

Responsive to determining that the privacy level satisfies the threshold privacy level, PMM 126 may determine whether an individual is proximate to PSD 112. In some instances, if PSD 212 is not included as part of computing device 110, PMM 126 may determine whether an individual is proximate to computing device 110. PMM 126 may determine whether an individual is proximate to PSD 112 based on sensor data generated by one or more sensors (e.g., sensor components 252 of FIG. 2) associated with computing device 110. For example, computing device 110 may include an optical image sensor (e.g., a camera, a proximity sensor, etc.), an audio sensor (e.g., a microphone), etc., which may be used to detect whether an individual is proximate to PSD 112 and/or computing device 110. For instance, PMM 126 may determine that an individual is proximate PSD 112 by analyzing image data from an optical image sensor and determining the image data includes an indication of an unauthorized individual.

PMM 126 may determine whether an individual that is proximate to PSD 112 of computing device 110 is associated with a currently active user account of the computing device. For example, computing device 110 may be configured with one or more user accounts where a particular user account from the one or more configured user accounts may be active when information is output by computing device 110. In some instances, PMM 126 may determine whether an individual that is proximate to PSD 112 of computing device 110 is authorized to consume information output by computing device 110 by performing facial recognition, voice analysis, etc. For instance, PMM 126 may determine that user 130 is associated with the currently active user account and that unauthorized individuals 132A and 132B are not associated with the currently active user account.

PMM 126 may determine an estimated speed of the unauthorized individual relative to PSD 112 and/or computing device 110 in response to determining that the unauthorized individual is proximate to PSD 112. For example, where the sensor data includes image data, PMM 126 may identify an individual in a plurality of images and track the movement (if any) of the individual between the plurality of images. Using the tracked movement and the image capture rate, PMM 126 may estimate how fast the individual is moving relative to PSD 112 of computing device 110. PMM 126 may estimate that unauthorized individual 132A is moving with an estimated speed $S_1$ relative to PSD 112 of computing device 110 and that unauthorized individual 132B is not moving relative to PSD 112 of computing device 110 (e.g., the estimated relative speed $S_2$ of individual 132B is approximately equal to zero).

PMM 126 may determine whether the estimated speed satisfies (e.g., is less than or equal to) a threshold speed. The threshold speed may be a single value or may be variable. For instance, the threshold speed may be based on the estimated distance between the unauthorized individual not associated with the currently active user account and computing device 110. The threshold speed may be inversely proportional to the estimated distance. In some examples, PMM 126 may increase the threshold speed as the estimated distance decreases. For example, if the estimated distance between unauthorized individual 132A and PSD 112 of computing device 110 is relatively short (e.g., one meter), the unauthorized individual 132A may be able to consume information output by computing device 110 even if the unauthorized individual 132A is more relatively fast. However, if the estimated distance between the unauthorized individual 132B and PSD 112 is relatively far (e.g., several meters), the unauthorized individual 132B may only be able to consume information output by computing device 110 if the unauthorized individual 132B is moving slowly.

In some examples, PMM 126 may determine threshold speed based on a privacy level of the information. For example, higher privacy levels may correspond to a higher threshold speed. For instance, personally identifiable information may correspond to a higher threshold speed than entertainment information. In some instances, PMM 126 may set the threshold speed based on the highest privacy level associated with the information to be output by computing device 110. For instance, as shown in FIG. 1, when the information includes personally identifiable information (e.g., social security number) which corresponds to a higher privacy level than entertainment information, PMM 126 may set the threshold speed based on the personally identifiable information. Dynamically adjusting the threshold speed may enable computing device 110 to more accurately determine when to obscure at least a portion of the information, such that the information is not obscured unnecessarily, which may improve the user experience by obscuring data only when other individuals are proximate to PSD 112 of computing device 110 and are moving slow enough to consume information output by computing device 110.

If PMM 126 determines that the estimated speed satisfies (e.g., is less than) the threshold speed, PMM 126 may cause UI module 120 to output the information such that at least a portion of the information is obscured (e.g., concealed or obfuscated). In other words, if the individual's estimated speed relative to PSD 112 of computing device 110 is less than the threshold speed, PMM 126 may determine that the individual could consume information output by computing device 110, and thus may cause computing device 110 to the information such that at least a portion of the information is obscured. For instance, PMM 126 may send an indication to UI module 120 that the information should be obscured, such that UI module 120 may output a graphical user interface 114 where at least a portion of information is obscured. For instance, as illustrated in FIG. 1, graphical user interface 114 includes the name, start date, salary, and social security number for several employees. Because PMM 126 determined that the privacy levels for salary and social security number satisfy the threshold privacy level, UI module 120 may cause that information to be obscured when displayed by PSD 112.

In some examples, UI module 120 may cause the information to be obscured by obfuscating or concealing the information. For example, UI module 120 may cause the information to be obfuscated by dimming the display or adjusting a font (e.g., reducing font size, changing the color, or changing the font type) or blurring the information. UI module 120 may conceal information by replacing certain alphanumerical characters with different alphanumerical characters or symbols. For instance, as shown in GUI 114, social security numbers are obscured by replacing numbers characters with letters. In some instances, UI module 120 may cause information to be obscured by refraining from displaying characters. For instance, as shown in GUI 114, UI module 120 may refrain from outputting a scale of the employee salary. By refraining from including a salary scale, individuals other than the active user may not be able to ascertain whether the salary is an hourly wage, or yearly salary, or some other indication of an employee salary.

If PMM 126 determines that the estimated speed does not satisfy (e.g., is greater than) the threshold speed, PMM 126 may cause UI module 120 to output the information. In other words, if the individual's estimated speed relative to PSD 112 of computing device 110 is faster than the threshold speed, PMM 126 may determine the individual is unlikely to consume information output by computing device 110, and thus may cause computing device 110 to output the information without obscuring the information. For instance, PMM 126 may send an indication to UI module 120 that the information should not be obscured, such that UI module 120 may output a graphical user interface including a portion of the information, where the information is not obscured. In some examples, as illustrated in FIG. 1, because PMM 126 determined the privacy levels for the employee name and start date do not satisfy the threshold privacy level, UI module 120 may cause PSD 112 to display the employee names and start dates without obscuring the information.

In some examples, PMM 126 may determine the estimated speed of an individual at different times. For instance, PMM 126 may estimate, at a first time, the speed of an unauthorized individual relative to PSD 112 of computing device 110 and may determine that the estimated speed of the individual at the first time satisfies (e.g., is less than) the threshold speed. Thus, in some instances, PMM 126 may cause PSD 212 to obscure at least a portion of the information at the first time. PMM 126 may estimate the speed of the unauthorized individual relative to PSD 112 at a later, second time. If the estimated speed at the second time no longer satisfies the threshold speed, PMM 126 may cause PSD 212 to display at least a portion of the information without obscuring the displayed portion. Similarly, in some instances, PMM 126 may determine that the estimated speed does not satisfy the threshold at the first time and that the estimated speed does satisfy the threshold at the second time, such that PSD 212 may output information without obscuring the information at the first time and may obscure at least a portion of the information at the second time.

In this way, techniques of this disclosure may enable a computing device to selectively obscure private information output by the computing device. By determining whether an unauthorized individual (e.g., an individual that is not associated with the currently active user account) is proximate to the computing device and/or the display device, and, if so, whether the unauthorized individual is likely to be able to consume information output by the computing device. By obscuring private information when such an individual may consume the private information, the computing device may reduce the ability of such individuals to consume private information. As a result, the computing device obscure private information without using a privacy screen, which may otherwise filter the amount of light visible to the user such that a user may increase brightness of the display. Dynamically obscuring information without using a privacy screen may enable a computing device to obscure private info while reducing the display brightness, which may reduce the energy consumed by the display. By refraining from obscuring the information when unauthorized individuals are less likely to consume information output by the computing device, the computing device may refrain from obscuring information when outputting the information, which may improve the user experience for individuals associated with the currently active user account.

Figure 2:
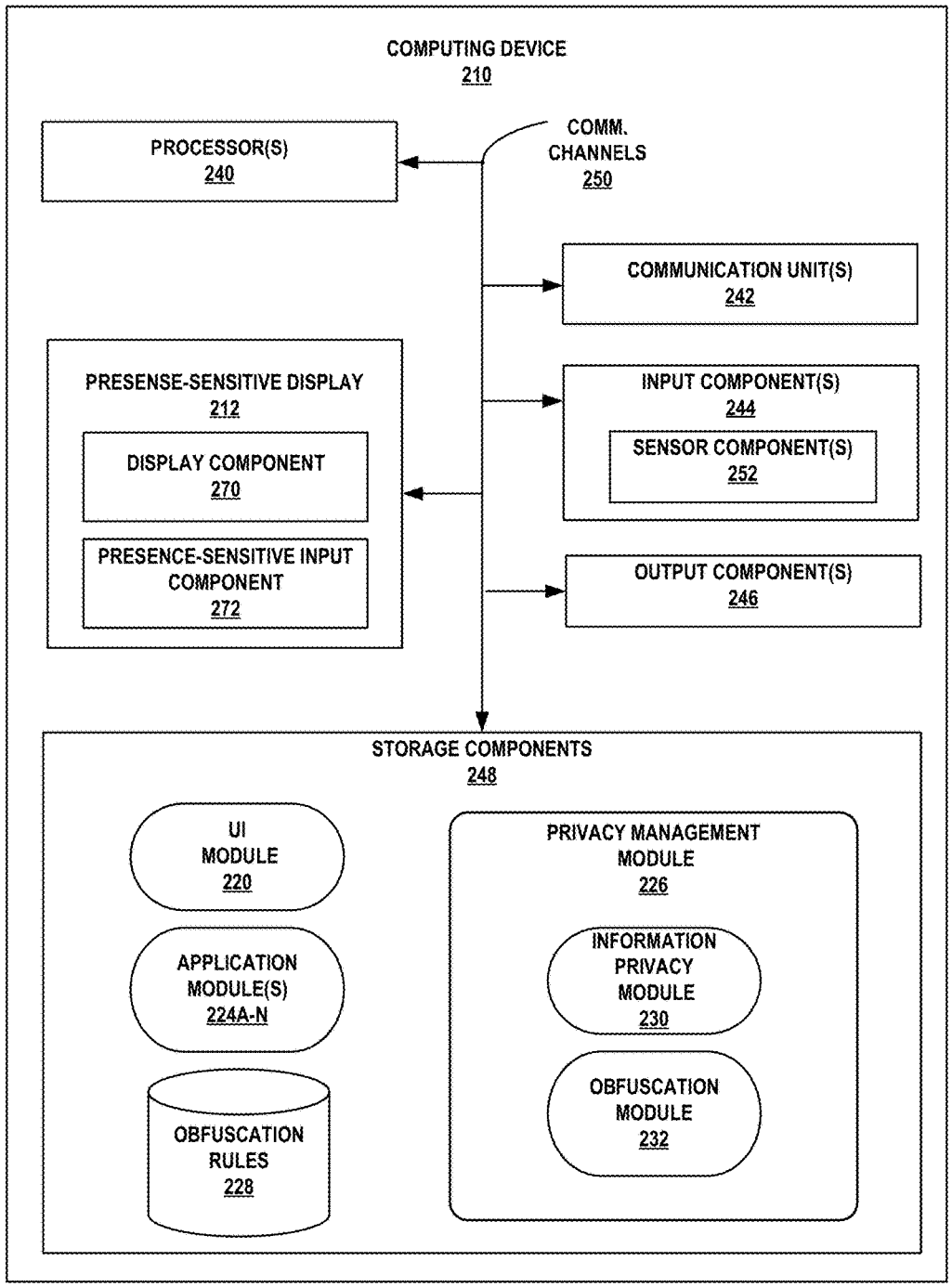
FIG. 2 is a block diagram illustrating an example computing device that is configured to selectively obscure private information, in accordance with one or more aspects of the present disclosure.

FIG. 2 is a block diagram illustrating an example computing device that is configured to selectively obscure private information, in accordance with one or more aspects of the present disclosure. Computing device 210 of FIG. 2 is described below as an example of computing device 110 illustrated in FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes presence-sensitive display 212, one or more processors 240, one or more communication units 242, one or more input components 244, one or more output components 246, one or more storage components 248, and one or more sensor components 252. Presence-sensitive display 212 includes display component 270 and presence-sensitive input component 272. Storage components 248 of computing device 210 may include UI module 220, one or more application modules 224A-N (collectively, "application modules 224"), PMM 226, and obfuscation rules data store 228. PMM 226 includes information privacy module (IPM) 230 and obfuscation module (OM) 232.

Communication channels 250 may interconnect each of the components 212, 240, 242, 244, 246, 248, and 252 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, includes a presence-sensitive display, touch-sensitive screen, mouse, keyboard, voice responsive system, video camera, microphone, or any other type of device for detecting input from a human or machine. In some examples, input components 244 may include one or more sensor components 252. Sensor components 252 may include one or more location sensors (GPS components, Wi-Fi components, cellular components), one or more temperature sensors, one or more movement sensors (e.g., accelerometers, gyros), one or more ambient pressure sensors (e.g., barometer), one or more optical sensors (e.g., proximity sensor, optical image sensor, etc.). Sensor components 252 may include a heart rate sensor, magnetometer, glucose sensor, olfactory sensor, compass sensor, step counter sensor, or other type of sensor.

One or more output components 246 of computing device 210 may generate output. Examples of output are tactile, audio, and video output. Output components 246 of computing device 210 may include a presence-sensitive display, sound card, video graphics adapter card, speaker, cathode ray tube (CRT) monitor, liquid crystal display (LCD), or any other type of device for generating output to a human or machine.

Presence-sensitive display 212 of computing device 210 includes display component 270 and presence-sensitive input component 272. Display component 270 may be a screen at which information is displayed by presence-sensitive display 212. Presence-sensitive input component 272 may detect an object at and/or near display component 270. As one example range, presence-sensitive input component 272 may detect an object, such as a finger or stylus that is within two inches or less of display component 270. Presence-sensitive input component 272 may determine a location (e.g., an (x,y) coordinate) of display component 270 at which the object was detected. In another example range, presence-sensitive input component 272 may detect an object six inches or less from display component 270 and other ranges are also possible. Presence-sensitive input component 272 may determine the location of display component 270 selected by a user's finger using capacitive, inductive, and/or optical recognition techniques.

In some examples, presence-sensitive input component 272 also provides output to a user using tactile, audio, or video stimuli as described with respect to display component 270. In the example of FIG. 2, presence-sensitive display 212 displays a graphical user interface. While illustrated as an internal component of computing device 210, presence-sensitive display 212 may also represent an external component that shares a data path with computing device 210 for transmitting and/or receiving input and output. For instance, in one example, presence-sensitive display 212 represents a built-in component of computing device 210 located within and physically connected to the external packaging of computing device 210 (e.g., a screen on a mobile phone). In another example, presence-sensitive display 212 represents an external component of computing device 210 located outside and physically separated from the packaging of computing device 210 (e.g., a monitor, a projector, etc. that shares a wired and/or wireless data path with a tablet computer).

One or more processors 240 may implement functionality and/or execute instructions within computing device 210. For example, processors 240 on computing device 210 may receive and execute instructions stored by storage components 248 that execute the functionality of modules 220, 224, and 226. The instructions executed by processors 240 may cause computing device 210 to store information within storage components 248 during program execution. Examples of processors 240 include application processors, display controllers, sensor hubs, and any other hardware configure to function as a processing unit. Modules 220, 224, and 226 may be operable by processors 240 to perform various actions, operations, or functions of computing device 210. For examples, processors 240 of computing device 210 may retrieve and execute instructions stored by storage devices 248 that cause processors 240 to perform the operations of modules 220, 224, and 226. The instructions, when executed by processors 240, may cause computing device 210 to store information within storage devices 248.

One or more storage components 248 within computing device 210 may store information for processing during operation of computing device 210 (e.g., computing device 210 may store data accessed by modules 220, 224, and 226 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 may be configured to store larger amounts of information than volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 224, 226, as well as obfuscation rules data store 228.

Application modules 224 may include the functionality of application modules 124 of computing device 110 of FIG. 1 and may perform similar operations as application modules 124. A user of computing device 210 may interact with an interface (e.g., a graphical user interface) associated with one or more application modules 224 to cause computing device 210 to perform a function.

UI module 220 may include the functionality of UI module 120 of computing device 110 of FIG. 1 and may perform similar operations as UI module 120 for outputting information to a user of computing device 210. For example, UI module 220 may receive a user input to execute or interact with a particular application module of application modules 224. For instance, UI module 220 may detect a user input to open a data file, view a notification, send a message (e.g., text, email, etc.), and the like.

PMM 226 may include the functionality of PMM 126 of computing device 110 of FIG. 1 and may perform similar operations as PMM 126 for selectively obscuring private information output by computing device 210. PMM 226 may include various submodules, such as IPM 230 and OM 232, which may perform the functionality of PMM 226. For example, IPM 230 may determine whether an individual other than the active user of computing device 210, also referred to as an unauthorized individual, may consume the private information and, if so, OM 232 may cause computing device 210 to obscure at least a portion of the private information when outputting the information.

IPM 230 may determine the privacy level based at least in part on a type of information to be displayed. The type of information may be based on an application module 124 associated with the information. For example, messaging information may include information associated with one or more messaging application modules (e.g., an email messaging application module, a text messaging application module, an instant messaging application module, etc.). As another example, financial information may include information associated with one or more financial application modules (e.g., a banking application, a personal finance application module, a spreadsheet application module, etc.). Entertainment information may, in some examples, include information associated with one or more entertainment application modules (e.g., a gaming application module, a social media application module, a video or music application module, etc.). Additional types of information may include navigation information, scheduling information, news information, fitness information, or any other type of information. In some examples, IPM 230 may assign a relatively high privacy level (e.g., 90 out of 100) to information associated with certain application modules (e.g., financial application modules), a medium privacy level (e.g., 60 out of 100) to information associated with other application modules (e.g., messaging application modules), and relatively low privacy level (e.g. 20 out of 100) to information associated with still other application modules (e.g., entertainment application modules).

The type of information may be based on the content of the information to be displayed. For instance, the content may include personally identifiable information that may be used to identify an individual (e.g., name, social security number, etc.). The type of the content may include financial information (e.g., salary, account balances, transaction amounts, etc.). In some examples, the type of the content includes location information (e.g., addresses, GPS coordinates, etc.), health information (e.g., age, weight, medical conditions, medications, etc.), or any other type of content. In some examples, IPM 230 may assign a relatively high privacy level (e.g., "very private") to personally identifiable information, a medium privacy level (e.g., "semi-private") to financial information, and relatively low privacy level (e.g., non-private) to other information (e.g. date/time information). In some examples, all instances of the same type of content may be assigned the same privacy level. In some examples, some instances of a particular type of content may be assigned different privacy levels. For example, if the type of content includes personally identifiable information, instances of social security numbers may be assigned different privacy levels than instances of names.

In some examples, the type of information may be based on a structure or format of the information. For instance, financial information may have a particular structure (e.g., the formatting may include a financial structure that includes a "$" symbol). Personally identifiable information may include a phone number (e.g., structured as XXX-XXX-XXXX), a social security number (e.g., structured as YYY-YY-YYYY), a date (e.g., a birthdate structured as MM/DD/YYYY), etc. Location information may be structured as street, city, state, zipcode. Other data structures may indicate other types of information, which may be used to determine a privacy level associated with at least a portion of the information.

In some examples, IPM 230 may determine the privacy level for a particular portion of information based at least in part on a location of computing device 110, time of day, the identity of one or more individuals that are proximate to PSD 112 of computing device 110, etc. For example, IPM 230 may assign a first privacy level to a portion of information at a first location (e.g., the user's work) and a second privacy level to the portion of information at a second location (e.g., the user's home). For instance, user 130 may consider his/her social security number to be very private and may not want computing device 210 to output such information while the user is at work, but may not object to outputting the information at home even if the user's spouse or children may consume the information. Thus, in some examples, IPM 230 may assign a different (e.g., higher) privacy level to a particular portion of information when computing device 210 is located at the user's work compared to the privacy level assigned to the particular information when computing device 210 is located at the user's work.

IPM 230 may determine whether the privacy level for the information to be output satisfies a threshold privacy level. In some examples, the privacy level for the information satisfies the threshold privacy level when the privacy level is greater than or equal to the threshold privacy level. For example, if IPM 230 determines the privacy level for a particular portion of the information is 60 out of 100 and the threshold privacy level equals 55 out of 100, IPM 230 may determine that the privacy level satisfies the threshold privacy level because the privacy level for the information is greater than the threshold privacy level.

In some examples, IPM 230 determines whether an unauthorized individual (e.g., an individual not associated with a currently active user account of the computing device, such as unauthorized individuals 132 of FIG. 1) is proximate to PSD 212 and/or computing device 210. IPM 230 may determine whether an individual is proximate to PSD 212 of computing device 210 based on sensor data generated by one or more sensor components 252. For example, computing device 210 may include an optical image sensor (e.g., a camera, a proximity sensor, etc.), an audio sensor (e.g., a microphone), etc., which may be used to detect whether an individual is proximate to PSD 212. For instance, IPM 230 may determine that an individual is proximate PSD 212 of computing device 210 by analyzing image data from an optical image sensor and determining the image data includes an image of a person. In some instances, IPM 230 may determine that an individual proximate to PSD 212 is an unauthorized individual (e.g., is not associated with the currently active user account) by performing facial recognition, voice analysis, or other analysis used to identify the individual. In some examples, IPM 230 114 may determine if the image data includes one or more faces. If the image data includes more than one face, IPM 230 may determine that an unauthorized individual is proximate to PSD 212 of computing device 210. As another example, IPM 230 may analyze ambient audio data captured by one of input components 244 (e.g., a microphone) to determine if voices associated with more than one user are included in the audio data. If more than one voice is detected in the audio data, IPM 230 may determine that an unauthorized individual is proximate to PSD 212 of computing device 210.

In some examples, IPM 230 may determine whether an individual is proximate to PSD 212 based on communication data from one or more communication units 242. For example, computing device 210 may be communicatively coupled (e.g., via WiFi®, Bluetooth®, near-field communications, etc.) to a remote computing device (e.g., remote computing device 118 of FIG. 1) and may determine that an individual is proximate to PSD 212 of computing device 210 if computing device 210 receive wireless communication data from a remote computing device 118. In some instances, IPM 230 may determine that the remote computing device is associated with an unauthorized individual 132 if the remote computing device is not paired to computing device 210.

IPM 230 may determine that an individual is an unauthorized individual for the information even if the individual is the currently active user of computing device 210. For example, IPM 230 may determine whether the currently active user corresponds to an intended recipient of information to be output by computing device 210. For example, computing device 210 may be locked and may receive a notification (e.g., email) addressed to a particular user. IPM 230 may determine whether the notification was intended for the active user. For instance, multiple users may be logged into computing device 210, and IPM 230 may determine the currently active user is an unauthorized individual if computing device 210 is logged into a guest account and the notification is addressed to a user of a different account.

IPM 230 may determine that an unauthorized individual is proximate to PSD 212 if IPM 230 detects any unauthorized individual, regardless of the distance between the unauthorized individual and computing device 210. For instance, if the image data captured by an image sensor indicates that an unauthorized individual is within the field of view of the image sensor, IPM 230 may determine such an individual is proximate to PSD 212. However, in some examples, IPM 230 may detect an unauthorized individual and may determine that the unauthorized individual is proximate to PSD 212 if an estimated distance between the unauthorized individual and PSD 212 of computing device 210 is less than or equal to a threshold distance (e.g., within 3 meters, 10 meters, etc.).

IPM 230 may estimate a distance between computing device 210 and an unauthorized individual based on the communication data from communication units 242, sensor data from sensor components 252, or a combination therein. For example, IPM 230 may determine an estimated distance between PSD 212 of computing device 210 and an unauthorized individual based on a signal strength for communication data exchanged between computing device 210 and a remote computing device. As another example, IPM 230 may determine an estimated distance between computing device 210 and an unauthorized individual based on image data from an image sensor (e.g., based on the number of image pixels that capture the unauthorized individual).

Responsive to determining that one or more unauthorized individuals are proximate to PSD 212, IPM 230 may determine whether an estimated speed of the unauthorized individual relative to computing device 210 satisfies a threshold speed. For example, where the sensor data includes image data, IPM 230 may identify an individual in a plurality of images and track the movement (if any) of the individual between the plurality of images. Using the tracked movement and the image capture rate, IPM 230 may estimate how fast the individual is moving relative to PSD 212.

IPM 230 may compare the estimated speed of the unauthorized individual to a threshold speed. In some examples, the threshold speed may be based at least in part on the estimated distance between PSD 212 computing device 210 and the unauthorized individual. For example, IPM 230 may increase the threshold speed as the estimated distance decreases. For instance, an unauthorized individual may be able to consume information output by computing device 210 at short distances even if the unauthorized individual is moving quickly, but may only be able to consume information output by computing device 210 at longer distances if the unauthorized individual is moving slowly. In some examples, the threshold speed may be based at least in part on the privacy level of at least some of the information to be output by computing device 210. IPM 230 may determine that higher privacy levels may correspond to a higher threshold speed. For example, a first portion of the information to be output may correspond to a high privacy level and a second portion of the information may correspond to a lower privacy level. Thus, in some examples, IPM 230 may set the threshold speed to the threshold that corresponds to the higher privacy level.

IPM 230 may determine a direction of travel of the unauthorized individual. For example, IPM 230 may determine, based on a change in a signal strength of the communication data, whether the 230 individual is moving towards or away from computing device 210. Similarly, IPM 230 may determine a direction of travel of an unauthorized individual by determining whether a size of an individual in the image data is changing, or by determining whether ambient audio data captured by a microphone is changing. For instance, IPM 230 may determine an unauthorized individual is getting closer if the ambient audio gets louder or the size of the individual in the image data is getting larger. IPM 230 may determine an unauthorized individual is moving away from computing device 210 if the ambient audio gets quieter or the size of the individual in the image data gets smaller.

OM 232 may determine an obfuscation level for the data in response to determining that the estimated speed of the unauthorized individual satisfies (e.g., is less than or equal to) the threshold speed. Additionally or alternatively, OM 232 may determine an obfuscation level in response to determining the unauthorized individual is traveling towards computing device 210. OM 232 may cause UI module 220 to output the information such at least a portion of the information is obscured according to the obfuscation level. UI module 220 may cause the information to be obscured when outputting audio data, graphical data, or any other type of data. In some instances, obscuring graphical data includes obscuring textual data.

OM 232 may determine an obfuscation level for each portion of the information and may output an indication of the obfuscation level to UI module 220, such that UI module 220 may cause PSD 212 to obscure a portion of the information based on the obfuscation level. OM 232 may determine an obfuscation level for a particular portion of information based on obfuscation rules data store 228. Obfuscation rules data store 228 may include one or more files, tables, databases, or other data structure that represents rules for obscuring private information. For example, obfuscation rules data store 228 may include a set of privacy levels and an obfuscation level corresponding to each privacy level. In some examples, the obfuscation levels indicate one or more techniques to obscure information, such as blurring text, replacing characters with placeholder characters, changing a font (e.g., size, color, type, or other attribute), dimming a screen, increasing the speed of audio data, replacing audible words with a generic audible tone, etc.

In some examples, OM 232 may determine a single obfuscation level for all of the information to be output by computing device 210. In other words, IPM 230 may determine to obscure all of the information using same obfuscation techniques. In some instances, IPM 230 may determine the single obfuscation level based on the highest privacy level associated with the information. For instance, if IPM 230 determines the privacy level for a particular portion of information is "private" and the privacy level for another portion of the information is "very private," OM 232 may determine the obfuscation level for both portions of information should be the obfuscation level corresponding to a "very private" privacy level. Thus, in examples where a privacy level of "private" corresponds to dimming the screen brightness and a privacy level of "very private" corresponds to blurring text, OM 232 may determine that PSD 212 should display blurred text when outputting the information.

In some examples, OM 232 determines a privacy level for each respective portion of information. For instance, if the information to be output by computing device 210 includes personally identifiable information and financial information, IPM 230 may determine the privacy level for personally identifiable information is 90 out of 100 and the privacy level for financial information is 70 out of 100. OM 232 may query obfuscation rules data store 228 and determine that a privacy level of 90 corresponds to the high obfuscation level, such that the personally identifiable information is obscured by replacing the personally identifiable information with placeholder characters. Similarly, OM 232 may query obfuscation rules data store 228 and may determine that a privacy level of 70 corresponds to a medium obfuscation level, such that the financial information is obscured by truncating the information to only display a portion of the financial information or by removing reference to units. For instance, as illustrated by graphical user interface 114 of FIG. 1, OM 232 may determine that personally identifiable information (e.g., social security numbers) should be obscured by replacing digits [0-9] with letters, and that the financial information (e.g., salary) should be obscured by removing reference to whether the salary is hourly, annually, or some other unit.

OM 232 may determine an obfuscation level corresponding to the information based at least in part on the location of computing device 210. For example, OM 232 may determine the information should be obscured differently in different locations. For instance, OM 232 may determine the obfuscation level should be higher in public locations (e.g., a park, train, etc.) relative to semi-public locations (e.g., work) or private locations (e.g., home). Thus, in some examples, if the information includes the user's phone number, OM 232 may determine the phone number should be highly obscured when computing device 210 is in a public location, slightly obscured in a semi-public location, and not obscured at all in a private location. Responsive to determining the obfuscation level, OM 232 may output an indication of the obfuscation level and the information to UI module 220.

In some examples, OM 232 may cause computing device 210 to refrain from obscuring the information in response to determining that the speed of the unauthorized individual does not satisfy (e.g., is greater than) the threshold speed, in response to determining the unauthorized individual is traveling away from computing device 210, or both. For example, if the unauthorized individual is moving very fast relative to computing device 210, or is moving away from computing device 210, the unauthorized individual is less likely to be able to consume information output by computing device 210. Thus, computing device 210 may output the information without obscuring the information. By selectively obscuring private information when an unauthorized individual is likely to be able to consume the information, and by refraining from obscuring information when the unauthorized individual is not likely to be able to consume the information, computing device 210 may improve privacy without using privacy screens.

Figure 3:
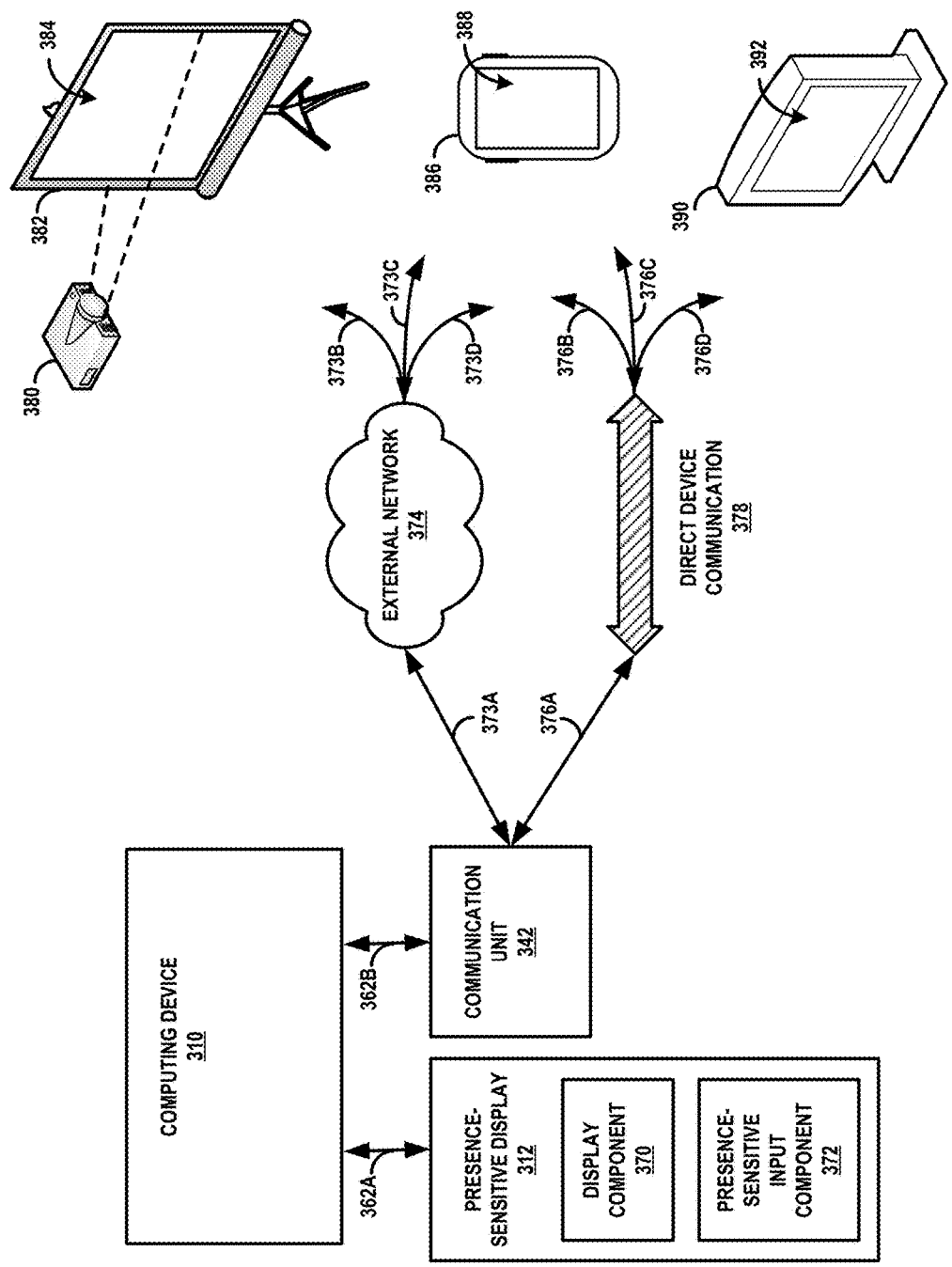
FIG. 3 is a block diagram illustrating an example computing device that is configured to selectively obscure private information at a remote device, in accordance with one or more aspects of the present disclosure.

FIG. 3 is a block diagram illustrating an example computing device that is configured to selectively obscure private information at a remote device, in accordance with one or more techniques of the present disclosure. Graphical content, generally, may include any visual information that may be output for display, such as text, images, and a group of moving images, to name only a few examples. The example shown in FIG. 3 includes a computing device 310, a PSD 312, communication unit 342, projector 380, projector screen 382, mobile device 386, and visual display component 390. In some examples, PSD 312 may be a presence-sensitive display as described in FIGS. 1-2. Although shown for purposes of example in FIGS. 1 and 2 as a stand-alone computing device 110 and 210 respectively, a computing device such as computing device 310 may, generally, be any component or system that includes a processor or other suitable computing environment for executing software instructions and, for example, need not include a presence-sensitive display.

As shown in the example of FIG. 3, computing device 310 may be a processor that includes functionality as described with respect to processors 240 in FIG. 2. In such examples, computing device 310 may be operatively coupled to PSD 312 by a communication channel 362A, which may be a system bus or other suitable connection. Computing device 310 may also be operatively coupled to communication unit 342, further described below, by a communication channel 362B, which may also be a system bus or other suitable connection. Although shown separately as an example in FIG. 3, computing device 310 may be operatively coupled to PSD 312 and communication unit 342 by any number of one or more communication channels.

In other examples, such as illustrated previously by computing devices 110 and 210 in FIGS. 1-2 respectively, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

PSD 312 may include display component 370 and presence-sensitive input component 372. Display component 370 may, for example, receive data from computing device 310 and display the graphical content. In some examples, presence-sensitive input component 372 may determine one or more user inputs (e.g., continuous gestures, multi-touch gestures, single-touch gestures) at PSD 312 using capacitive, inductive, and/or optical recognition techniques and send indications of such user input to computing device 310 using communication channel 362A. In some examples, presence-sensitive input component 372 may be physically positioned on top of display component 370 such that, when a user positions an input unit over a graphical element displayed by display component 370, the location at which presence-sensitive input component 372 corresponds to the location of display component 370 at which the graphical element is displayed.

As shown in FIG. 3, computing device 310 may also include and/or be operatively coupled with communication unit 342. Communication unit 342 may include functionality of communication unit 242 as described in FIG. 2. Examples of communication unit 342 may include a network interface card, an Ethernet card, an optical transceiver, a radio frequency transceiver, or any other type of device that can send and receive information. Other examples of such communication units may include Bluetooth®, cellular, and WiFi® radios, Universal Serial Bus (USB®) interfaces, etc. Computing device 310 may also include and/or be operatively coupled with one or more other devices (e.g., input devices, output components, memory, storage devices) that are not shown in FIG. 3 for purposes of brevity and illustration.

FIG. 3 also illustrates a projector 380 and projector screen 382. Other such examples of projection devices may include electronic whiteboards, holographic display components, and any other suitable devices for displaying graphical content. Projector 380 and projector screen 382 may include one or more communication units that enable the respective devices to communicate with computing device 310. In some examples, the one or more communication units may enable communication between projector 380 and projector screen 382. Projector 380 may receive data from computing device 310 that includes graphical content. Projector 380, in response to receiving the data, may project the graphical content onto projector screen 382. In some examples, projector 380 may determine one or more user inputs (e.g., continuous gestures, multi-touch gestures, single-touch gestures) at projector screen using optical recognition or other suitable techniques and send indications of such user input using one or more communication units to computing device 310. In such examples, projector screen 382 may be unnecessary, and projector 380 may project graphical content on any suitable medium and detect one or more user inputs using optical recognition or other such suitable techniques.

Projector screen 382, in some examples, may include a presence-sensitive display 384. Presence-sensitive display 384 may include a subset of functionality or all of the functionality of presence-sensitive display 112, 212, and/or 312 as described in this disclosure. In some examples, presence-sensitive display 384 may include additional functionality. Projector screen 382 (e.g., an electronic whiteboard), may receive data from computing device 310 and display the graphical content. In some examples, presence-sensitive display 384 may determine one or more user inputs (e.g., continuous gestures, multi-touch gestures, single-touch gestures) at projector screen 382 using capacitive, inductive, and/or optical recognition techniques and send indications of such user input using one or more communication units to computing device 310.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other semi-stationary devices such as televisions, computer monitors, etc. As shown in FIG. 3, mobile device 386 may include a presence-sensitive display 388. Visual display component 390 may include a presence-sensitive display 392. Presence-sensitive displays 388, 392 may include a subset of functionality or all of the functionality of presence-sensitive display 112, 212, and/or 312 as described in this disclosure. In some examples, presence-sensitive displays 388, 392 may include additional functionality. In any case, presence-sensitive display 392, for example, may receive data from computing device 310 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 310.

As described above, in some examples, computing device 310 may output graphical content for display at PSD 312 that is coupled to computing device 310 by a system bus or other suitable communication channel. Computing device 310 may also output graphical content for display at one or more remote devices, such as projector 380, projector screen 382, mobile device 386, and visual display component 390. For instance, computing device 310 may execute one or more instructions to generate and/or modify graphical content in accordance with techniques of the present disclosure. Computing device 310 may output the data that includes the graphical content to a communication unit of computing device 310, such as communication unit 342. Communication unit 342 may send the data to one or more of the remote devices, such as projector 380, projector screen 382, mobile device 386, and/or visual display component 390. In this way, computing device 310 may output the graphical content for display at one or more of the remote devices. In some examples, one or more of the remote devices may output the graphical content at a presence-sensitive display that is included in and/or operatively coupled to the respective remote devices.

In some examples, computing device 310 may not output graphical content at PSD 312 that is operatively coupled to computing device 310. In other examples, computing device 310 may output graphical content for display at both a PSD 312 that is coupled to computing device 310 by communication channel 362A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 310 and output for display at PSD 312 may be different than graphical content display output for display at one or more remote devices.

Computing device 310 may send and receive data using any suitable communication techniques. For example, computing device 310 may be operatively coupled to external network 374 using network link 373A. Each of the remote devices illustrated in FIG. 3 may be operatively coupled to network external network 374 by one of respective network links 373B, 373C, or 373D. External network 374 may include network hubs, network switches, network routers, etc., that are operatively inter-coupled thereby providing for the exchange of information between computing device 310 and the remote devices illustrated in FIG. 3. In some examples, network links 373A-373D may be Ethernet, ATM or other network connections. Such connections may be wireless and/or wired connections.

In some examples, computing device 310 may be operatively coupled to one or more of the remote devices included in FIG. 3 using direct device communication 378. Direct device communication 378 may include communications through which computing device 310 sends and receives data directly with a remote device, using wired or wireless communication. That is, in some examples of direct device communication 378, data sent by computing device 310 may not be forwarded by one or more additional devices before being received at the remote device, and vice-versa. Examples of direct device communication 378 may include Bluetooth®, Near-Field Communication, Universal Serial Bus, WiFi®, infrared, etc. One or more of the remote devices illustrated in FIG. 3 may be operatively coupled with computing device 310 by communication links 376A-376D. In some examples, communication links 376A-376D may be connections using Bluetooth, Near-Field Communication, Universal Serial Bus, infrared, etc. Such connections may be wireless and/or wired connections.

In accordance with techniques of the disclosure, computing device 310 may selectively obscure private information output by computing device 310. Computing device 310 may determine a privacy level for information to be displayed and determine whether the privacy level satisfies (e.g., is greater than or equal to) a threshold privacy level. Computing device 310 may determine whether an individual may consume information output by computing device 310. For instance, computing device 310 may determine whether an individual is proximate to computing device 310 and/or proximate a display device associated with computing device 310 (e.g., projector screen 382, mobile device 386, or visual display component 390). Computing device 310 may also determine whether the individual is authorized to consume the information. In some example, in response to determining that an unauthorized individual is proximate to computing device 310 or a display device associated with computing device 310, computing device 310 may estimate a speed of the individual relative to computing device 310 or the display device. Computing device 310 may determine a direction of movement of the individual. Responsive to determining the estimated speed of the individual satisfies (e.g., is less than or equal to) a threshold speed, computing device 310 may output the information such that at least a portion of information is obscured. In some examples, computing device 310 may refrain from obscuring the information in response to determining the speed does not satisfy (e.g., is greater than) that threshold speed and/or determining the individual is moving away from computing device 310 or the display device.

Figure 4C:
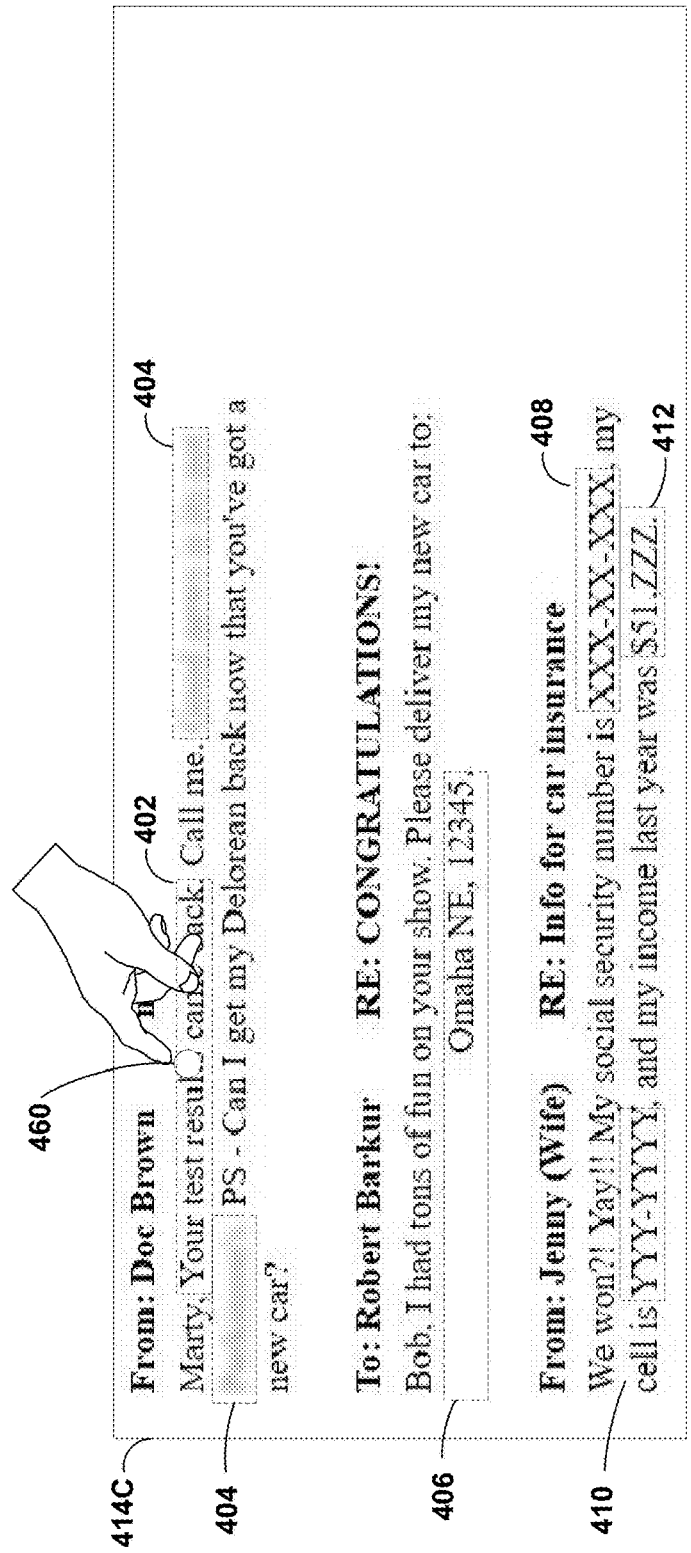

FIGS. 4A-4C are conceptual diagrams illustrating example graphical user interfaces that include selectively obscured information, in accordance with one or more aspects of the present disclosure. FIGS. 4A-4C illustrate example graphical user interfaces output by computing devices 100, 200 of FIGS. 1 and 2, respectively.

At a first time, PMI 126 of computing device 110 may determine a privacy level for various portions of information to be output by computing device 110. In some examples, computing device 110 may initially output the information without obscuring private portions of the information. For example, computing device 110 may output the information and may temporarily refrain from obscuring any of the private information. As illustrated in FIG. 4A, UI graphical user interface 414A may include health information 402 and 404, address information 406, personally identifiable information 408 and 410, and financial information 412. In some instances, UI module 120 of computing device 110 may cause PSD 112 to display the information and a notification 462 indicating that the private portions of the information will be obscured after a predetermined amount of time (e.g., 3 seconds). As a result, user 130 may briefly consume the private information while reducing the likelihood that unauthorized individuals are likely to be able to consume the information. Responsive to outputting the information without obscuring the private portions of the information, PMM 126 may start a timer to determine the amount of elapsed time since outputting the unobscured information.

PMM 126 may determine whether the amount of elapsed time satisfies (e.g., is greater than or equal to) a threshold amount of time. In response to determining the elapsed time satisfies the threshold time, PMM 126 may cause PSD 112 to obscure the private portions of the information at a second time. PMM 126 may determine a respective privacy level for various portions of the information and may determine a respective obfuscation level for each of the various portions of the information based on the privacy level. For example, PMM 126 may determine a privacy level for a first portion of the information (e.g., address information) and a different privacy level for a different portion of the information (e.g., health information). PMM 126 may determine obfuscation levels for the address information and the health information, respectively, based at least in part on the privacy level for the respective portions of the information. For instance, PMM 126 may assign a higher obfuscation level as the privacy level of the information increases. Thus, in some examples, PMM 126 may determine the privacy level of the health information 402 and 404 is higher than the privacy level for the address information 406, and may obscure the health information 402, 404 more than the address information 406.

Responsive to determining the obfuscation levels for the respective portions of the information, PMM 126 may output the various portions of information and an indication of the respective obfuscation levels to UI module 120. UI module 120 may receive the information and the respective obfuscation levels and may cause PSD 112 to display the information according to the obfuscation levels. Thus, some portions of information may be obscured in a manner different than the method used to obscure other portions of information. For instance, as illustrated by graphical user interface 414B, health information 402, 404 may be obfuscated (e.g., blurred), address information 406 may be truncated, personally identifiable information 408 and 410 (e.g., social security number and phone number, respectively) may be concealed (e.g., may have characters replaced with placeholder characters), and financial information 412 (e.g., salary) may have characters replaced.

At a third time, after outputting the information such that one or more portions of the information is obscured, computing device 110 may receive an indication of a user input selecting a particular portion of the information. For instance, as illustrated in FIG. 4C, PSD 212 may detect a user input selecting private health information 402 obscured at location 460. UI module 120 may output an indication of the user input (e.g., x,y coordinates) to PMM 126 and PMM 126 may determine that the user input corresponds to a command to display a portion of information at location 460 without obscuring the information. Thus, PMM 126 may update the obfuscation level for the private health information 402 displayed at location 460 and may send the updated obfuscation level to UI module 120. UI module 120 may receive the updated obfuscation level for the information displayed at location 460 and may cause PSD 112 to display graphical user interface 414C according to the updated obfuscation level. As a result, PSD 212 may refrain from obscuring the private health information 402 at location 460. In other words, PSD 212 may output the health information at location 460 such that the selected health information 402 is no longer obscured.

Figure 5:
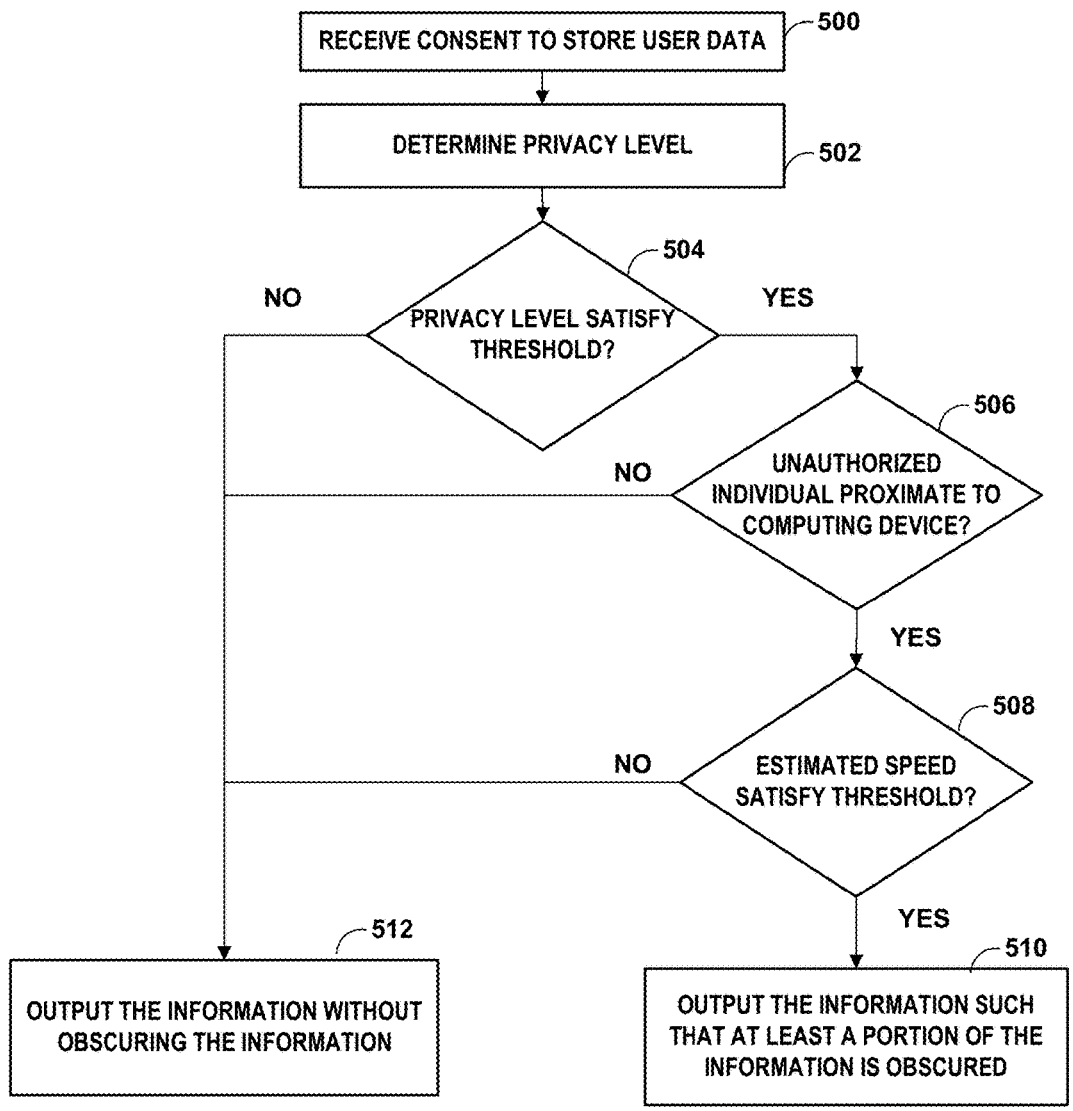
FIG. 5 is a flowchart illustrating example operations of a computing device that is configured to selectively obscure private information, in accordance with one or more aspects of the present disclosure.

FIG. 5 is a flowchart illustrating an example operation of the computing device configured to selectively obscure private information, in accordance with one or more aspects of the present disclosure. The process of FIG. 4 may be performed by one or more processors of a computing device, such as computing devices 110 and 210 as illustrated in FIG. 1 and FIG. 2, respectively. For purposes of illustration only, FIG. 4 is described below within the context of computing device 110 and 210 of FIG. 1 and FIG. 2, respectively.

Computing device 110 may receive consent to store user data (500). Computing device 110 may only store information associated with a user of computing device 110 if the user affirmatively consents to such collection of information. Computing device 110 may further provide opportunities for the user to withdraw consent and in which case, computing device 110 may cease collecting or otherwise retaining the information associated with that particular user. Responsive to receiving user consent to store user data, computing device 110 may store contextual information, such as action usage information and/or application usage information.

In some examples, computing device 110 may determine a privacy level for information to be output by computing device 110 (502). Computing device 110 may determine a single privacy level for all of the information to be output or may determine privacy levels for one or more different, respective portions of the information. The privacy level may be based at least in part on a type of information to be displayed. In some instances, computing device 110 may determine the type of information based on an application module 124 associated with the information, a data structure or format of the information, or the content of the information. For instance, computing device 110 may assign a higher privacy level to types of information the user is more likely to prefer are not shared with other persons (e.g., personally identifiable information) relative to types of information that the user may not care as much about (e.g., entertainment information).

Computing device 110 may determine whether the privacy level satisfies (e.g., is greater than) a threshold privacy level (504). The threshold privacy level may be based on the location of computing device 110. For instance, computing device 110 may determine that the threshold privacy level is a first value when computing device 110 is located at one location (e.g., the user's home) and that the threshold privacy level is a second value when computing device 110 is located at a different location (e.g., a park, train, or other public setting).

Responsive to determining that the privacy level satisfies the threshold privacy level ("YES" branch of 504), computing device 110 may determine whether an unauthorized individual is proximate to PSD 112 and/or computing device 110 (506). In some examples, an unauthorized individual refers to an individual not associated with the currently active user account of computing device 110. Computing device 110 may determine whether an individual is proximate to PSD 112 based on sensor data generated by a sensor associated with computing device 110 and/or communication data from a communication component of computing device 110. In some examples, computing device 110 may determine whether the individual is unauthorized to consume information output by computing device 110 by analyzing a characteristic of the sensor data and/or communication data. For instance, computing device 110 may perform facial analysis on image data or voice analysis on audio data. Similarly, computing device 110 may analyze audio data or image data to determine whether multiple individuals are present, and may infer that at least one of the individuals is not the currently active user. Computing device 110 may determine an unauthorized user is proximate to PSD 112 by determining that communication data received by one or more communication components (e.g., a Bluetooth® radio) was received from a device not paired or synced with computing device 110.

In some examples, responsive to determining an unauthorized individual is proximate to PSD 112 of computing device 110 ("YES" branch of 506), computing device 110 may determine an estimated speed of the unauthorized individual relative to PSD 112 of computing device 110 and determine whether the estimated speed satisfies a threshold speed (508). Computing device 110 may determine the estimated speed based on the sensor data and/or the communication data. For example, the computing device may determine an estimated speed of an unauthorized individual detected in image data by tracking the individual across multiple images.

Computing device 110 may output the information such that at least a portion of the information is obscured (510) in response to determining the estimated speed satisfies a threshold speed ("YES" branch of 508). For example, computing device 110 may determine an obfuscation level for various portions of information based on the privacy level for the respective portions of information. For instance, higher privacy levels may correspond to higher obfuscation levels. In some examples, computing device 110 may determine a privacy level for a particular portion of information and query obfuscation rules data store 228 to determine an obfuscation level corresponding to the privacy level. In response to determining the obfuscation level for a particular portion of information, computing device 110 may output the information such that the particular portion of information is obscured according to the determined obfuscation level.

Computing device 110 may refrain from obscuring the information and may output the unobscured information (512) in response to determining the privacy level does not satisfy the threshold privacy level ("NO" branch of 504), in response to determining there are not any unauthorized individuals proximate to PSD 112 of computing device 110 ("NO" branch of 506), or in response to determining the estimated speed does not satisfy the threshold speed ("NO" branch of 508). In other words, if the information is not private, if there are no unauthorized individuals proximate to computing device 110, or all of the unauthorized individuals that are proximate to PSD 112 are moving fast enough that they are unlikely to consume information output by computing device 110, computing device 110 may output the information without obscuring the information.

The following numbered examples may illustrate one or more aspects of the disclosure:

Example 1

A method comprising: determining, by one or more processors, based at least in part on a type of information to be displayed at a display device associated with a computing device, a privacy level for the information to be displayed;

determining, by the one or more processors, whether the privacy level satisfies a threshold privacy level; and responsive to determining that the privacy level satisfies the threshold privacy level: determining, by the one or more processors, based on sensor data generated by at least one sensor associated with the computing device, whether an individual not associated with a currently active user account of the computing device is proximate to the display device; responsive to determining the individual not associated with the currently active user account is proximate to the display device: determining, by the one or more processors, based at least in part on the sensor data, an estimated speed of the individual not associated with the currently active user account relative to the display device; determining, by the one or more processors, whether the estimated speed satisfies a threshold speed; and responsive to determining that the estimated speed satisfies the threshold speed, outputting, by the one or more processors, for display at the display device, the information such that at least a first portion of the information is obscured.

Example 2

The method of example 1, further comprising: determining, by the one or more processors, an estimated distance between the display device and the individual not associated with the currently active user account relative; and determining, by the one or more processors, based on the estimated distance, the threshold speed.

Example 3

The method of example 2, wherein the threshold speed is inversely proportional to the estimated distance between the display device and the individual not associated with the currently active user account.

Example 4

The method of any combination of examples 1-3, further comprising: responsive to determining that the privacy level does not satisfy the threshold privacy level, outputting, by the one or more processors, for display at the display device, the information.

Example 5

The method of any combination of examples 1-3, further comprising: determining, by the one or more processors, based at least in part on the determined privacy level, an obfuscation level for the first portion of the information, wherein outputting the first portion of the information comprises outputting, by the one or more processors, the first portion of the information based on the obfuscation level for the first portion of the information.

Example 6

The method of example 5, further comprising: determining, by the one or more processors, based at least in part on the determined privacy level, an obfuscation level for at least a third portion of the information, wherein the obfuscation level for the first portion of the information is different than the obfuscation level for the third portion of the information; and outputting, by the one or more processors, for display at the display device, based on the obfuscation level for the third portion of the information, the third portion of the information such that the third portion of the information is obscured in a manner different compared to how the first portion of the information is obscured.

Example 7

The method of any combination of examples 1-6, wherein the threshold privacy level is based on a location of the computing device.

Example 8

The method of any combination of examples 1-7, further comprising: after outputting the first portion of the information, receiving, by the one or more processors, an indication of a user input selecting the first portion of the information; determining, by the one or more processors, that the user input corresponds to a command to display the first portion of information without obscuring the first portion of information; and outputting, by the one or more processors, the first portion of the information such that the first portion of information is no longer obscured.

Example 9

The method of any combination of examples 1-8, further responsive to determining that the estimated speed satisfies the threshold speed: outputting, by the one or more processors, the first portion of the information such that the first portion of the information is not obscured; and after outputting the first portion of the information such that the first portion of the information is not obscured, determining, by the one or more processors, an amount of elapsed time since outputting the first portion of the information, wherein outputting the first portion of the information such that the first portion of the information is obscured is further responsive to determining the amount of elapsed time satisfies a threshold amount of time.

Example 10

The method of any combination of examples 1-9, wherein determining the estimated speed of the individual not associated with the currently active user account includes determining a first estimated speed of the individual at a first time, the method further comprising: determining, by the one or more processors, based at least in part on the sensor data, at a second time, a second estimated speed of the individual not associated with the currently active user account relative to the display device; determining, by the one or more processors, whether the second estimated speed satisfies the threshold speed; and responsive to determining the second estimated speed does not satisfy the threshold speed, outputting, by the one or more processors, for display at the display device, at least a second portion of the information.

Example 11

A computing device comprising: at least one processor; and a memory comprising instructions that, when executed by the at least one processor, cause the at least one processor to: determine, based at least in part on a type of information to be displayed at a display device associated with the computing device, a privacy level for the information to be displayed; determine whether the privacy level satisfies a threshold privacy level; and responsive to determining that the privacy level satisfies the threshold privacy level: determine, based on sensor data generated by at least one sensor associated with the computing device, whether an individual not associated with a currently active user account of the computing device is proximate to the display device; responsive to determining the individual not associated with the currently active user account is proximate to the display device: determine, based at least in part on the sensor data, an estimated speed of the individual not associated with the currently active user account relative to the display device; determine whether the estimated speed satisfies a threshold speed; responsive to determining that the estimated speed satisfies the threshold speed, output, for display at the display device, the information such that at least a first portion of the information is obscured; and responsive to determining that the estimated speed does not satisfy the threshold speed, output, for display at the display device, the information.

Example 12

The computing device of example 11, wherein the instructions further cause the at least one processor to: determine an estimated distance between the display device and the individual not associated with the currently active user account relative; and determine based on the estimated distance, the threshold speed.

Example 13

The computing device of example 12, wherein the threshold speed is inversely proportional to the estimated distance between the display device and the individual not associated with the currently active user account.

Example 14

The computing device of any combination of examples 11-13, wherein the instructions further cause the at least one processor to: responsive to determining that the privacy level does not satisfy the threshold privacy level, output, for display at the display device, the information.

Example 15

The computing device of any combination of examples 11-14, wherein the instructions further cause the at least one processor to: determine, based at least in part on the determined privacy level, an obfuscation level for the first portion of the information, and output the first portion of the information based on the obfuscation level for the first portion of the information.

Example 16

The computing device of example 15, wherein the instructions further cause the at least one processor to: determine, based at least in part on the determined privacy level, an obfuscation level for at least a third portion of the information, wherein the obfuscation level for the first portion of the information is different than the obfuscation level for the third portion of the information; and output, for display at the display device, based on the obfuscation level for the third portion of the information, the third portion of the information such that the third portion of the information is obscured in a manner different compared to how the first portion of the information is obscured.

Example 17

The computing device of any combination of examples 11-16, wherein the threshold privacy level is based on a location of the computing device.

Example 18

The computing device of any combination of examples 11-17, wherein the instructions further cause the at least one processor to: after outputting the first portion of the information, receive an indication of a user input selecting the first portion of the information; determine that the user input corresponds to a command to display the first portion of information without obscuring the first portion of information; and output the first portion of the information such that the first portion of information is no longer obscured.

Example 19

The computing device of any combination of examples 11-18, wherein the instructions further cause the at least one processor to: further responsive to determining that the estimated speed satisfies the threshold speed: output the first portion of the information such that the first portion of the information is not obscured; and after outputting the first portion of the information such that the first portion of the information is not obscured, determining an amount of elapsed time since outputting the first portion of the information, output the first portion of the information such that the first portion of the information is obscured in further response to determining the amount of elapsed time satisfies a threshold amount of time.

Example 20

The computing device of any combination of examples 11-19, wherein the estimated speed of the individual is a first estimated speed of the individual at a first time, and wherein the instructions further cause the at least one processor to: determine, based at least in part on the sensor data, at a second time, a second estimated speed of the individual not associated with the currently active user account relative to the display device; determine whether the second estimated speed satisfies the threshold speed; and responsive to determining the second estimated speed does not satisfy the threshold speed, output, for display at the display device, at least a second portion of the information.

Example 21

A non-transitory computer-readable storage medium encoded with instructions that, when executed by at least one processor of a computing device, cause the at least one processor to: determine, based at least in part on a type of information to be displayed at a display device associated with the computing device, a privacy level for the information to be displayed; determine whether the privacy level satisfies a threshold privacy level; and responsive to determining that the privacy level satisfies the threshold privacy level: determine, based on sensor data generated by at least one sensor associated with the computing device, whether an individual not associated with a currently active user account of the computing device is proximate to the display device; responsive to determining the individual not associated with the currently active user account is proximate to the display device: determine, based at least in part on the sensor data, an estimated speed of the individual not associated with the currently active user account relative to the display device; determine whether the estimated speed satisfies a threshold speed; responsive to determining that the estimated speed satisfies the threshold speed, output, for display at the display device, the information such that at least a first portion of the information is obscured; and responsive to determining that the estimated speed does not satisfy the threshold speed, output, for display at the display device, the information.

Example 22

The non-transitory computer-readable storage medium of claim 21, wherein the computer-readable storage medium comprises additional instructions that cause the at least one processor to: determine an estimated distance between the display device and the individual not associated with the currently active user account relative; and determine based on the estimated distance, the threshold speed.

Example 23

The non-transitory computer-readable storage medium of claim 22, wherein the threshold speed is inversely proportional to the estimated distance between the display device and the individual not associated with the currently active user account.

Example 24

The non-transitory computer-readable storage medium of any combination of claims 21-23, wherein the computer-readable storage medium comprises additional instructions that cause the at least one processor to: responsive to determining that the privacy level does not satisfy the threshold privacy level, output, for display at the display device, the information.

Example 25

The non-transitory computer-readable storage medium of any combination of claims 21-24, wherein the computer-readable storage medium comprises additional instructions that cause the at least one processor to: determine, based at least in part on the determined privacy level, an obfuscation level for the first portion of the information, and output the first portion of the information based on the obfuscation level for the first portion of the information.

Example 26

The non-transitory computer-readable storage medium of 25, wherein the computer-readable storage medium comprises additional instructions that cause the at least one processor to: determine, based at least in part on the determined privacy level, an obfuscation level for at least a third portion of the information, wherein the obfuscation level for the first portion of the information is different than the obfuscation level for the third portion of the information; and output, for display at the display device, based on the obfuscation level for the third portion of the information, the third portion of the information such that the third portion of the information is obscured in a manner different compared to how the first portion of the information is obscured.

Example 27

The non-transitory computer-readable storage medium of any combination of claims 21-26, wherein the threshold privacy level is based on a location of the computing device.

Example 28

The non-transitory computer-readable storage medium of any combination of claims 21-27, wherein the computer-readable storage medium comprises additional instructions that cause the at least one processor to: after outputting the first portion of the information, receive an indication of a user input selecting the first portion of the information; determine that the user input corresponds to a command to display the first portion of information without obscuring the first portion of information; and output the first portion of the information such that the first portion of information is no longer obscured.

Example 29

The non-transitory computer-readable storage medium of any combination of claims 21-28, wherein the computer-readable storage medium comprises additional instructions that cause the at least one processor to: further responsive to determining that the estimated speed satisfies the threshold speed: output the first portion of the information such that the first portion of the information is not obscured; and after outputting the first portion of the information such that the first portion of the information is not obscured, determining an amount of elapsed time since outputting the first portion of the information, output the first portion of the information such that the first portion of the information is obscured in further response to determining the amount of elapsed time satisfies a threshold amount of time.

Example 30

The non-transitory computer-readable storage medium of any combination of claims 21-29, wherein the estimated speed of the individual is a first estimated speed of the individual at a first time, and wherein the computer-readable storage medium comprises additional instructions that cause the at least one processor to: determine, based at least in part on the sensor data, at a second time, a second estimated speed of the individual not associated with the currently active user account relative to the display device; determine whether the second estimated speed satisfies the threshold speed; and responsive to determining the second estimated speed does not satisfy the threshold speed, output, for display at the display device, at least a second portion of the information.

Example 31

A system comprising: means for determining, based at least in part on a type of information to be displayed at a display device associated with a computing device, a privacy level for the information to be displayed; means for determining, whether the privacy level satisfies a threshold privacy level; and responsive to determining that the privacy level satisfies the threshold privacy level: means for determining, based on sensor data generated by at least one sensor associated with the computing device, whether an individual not associated with a currently active user account of the computing device is proximate to the display device; responsive to determining the individual not associated with the currently active user account is proximate to the display device: means for determining, based at least in part on the sensor data, an estimated speed of the individual not associated with the currently active user account relative to the display device; means for determining, whether the estimated speed satisfies a threshold speed; and responsive to determining that the estimated speed satisfies the threshold speed, means for outputting, for display at the display device, the information such that at least a first portion of the information is obscured.

Example 32

The method of example 31, further comprising: means for determining, an estimated distance between the display device and the individual not associated with the currently active user account relative; and means determining, based on the estimated distance, the threshold speed.

Example 33

The method of example 32, wherein the threshold speed is inversely proportional to the estimated distance between the display device and the individual not associated with the currently active user account.

Example 34

The method of any combination of examples 31-33, further comprising: responsive to determining that the privacy level does not satisfy the threshold privacy level, means for outputting, for display at the display device, the information.

Example 35

The method of any combination of examples 31-33, further comprising: means for determining, based at least in part on the determined privacy level, an obfuscation level for the first portion of the information, wherein the means for outputting the first portion of the information comprises means for outputting the first portion of the information based on the obfuscation level for the first portion of the information.

Example 36

The method of example 35, further comprising: means for determining, based at least in part on the determined privacy level, an obfuscation level for at least a third portion of the information, wherein the obfuscation level for the first portion of the information is different than the obfuscation level for the third portion of the information; and means for outputting, for display at the display device, based on the obfuscation level for the third portion of the information, the third portion of the information such that the third portion of the information is obscured in a manner different compared to how the first portion of the information is obscured.

Example 37

The method of any combination of examples 31-36, wherein the threshold privacy level is based on a location of the computing device.

Example 38

The method of any combination of examples 31-37, further comprising: after outputting the first portion of the information, means for receiving, an indication of a user input selecting the first portion of the information; means for determining that the user input corresponds to a command to display the first portion of information without obscuring the first portion of information; and means for outputting the first portion of the information such that the first portion of information is no longer obscured.

Example 39

The method of any combination of examples 31-38, further responsive to determining that the estimated speed satisfies the threshold speed: means for outputting the first portion of the information such that the first portion of the information is not obscured; and after outputting the first portion of the information such that the first portion of the information is not obscured, means for determining an amount of elapsed time since outputting the first portion of the information, wherein outputting the first portion of the information such that the first portion of the information is obscured is further responsive to determining the amount of elapsed time satisfies a threshold amount of time.

Example 40

The method of any combination of examples 31-39, wherein determining the estimated speed of the individual not associated with the currently active user account includes determining a first estimated speed of the individual at a first time, the method further comprising: means for determining, based at least in part on the sensor data, at a second time, a second estimated speed of the individual not associated with the currently active user account relative to the display device; means for determining whether the second estimated speed satisfies the threshold speed; and responsive to determining the second estimated speed does not satisfy the threshold speed, means for outputting, for display at the display device, at least a second portion of the information.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining, by one or more processors, based at least in part on a type of information to be displayed at a display device associated with a computing device, a privacy level for the information to be displayed;
   determining, by the one or more processors, that the privacy level satisfies a threshold privacy level;
   determining, by the one or more processors, based on sensor data generated by at least one sensor associated with the computing device, that an individual not associated with a currently active user account of the computing device is proximate to the display device;
   determining, by the one or more processors, based at least in part on the sensor data, an estimated speed of the individual not associated with the currently active user account relative to the display device;
   determining, by the one or more processors, that the estimated speed satisfies a threshold speed; and
   outputting, by the one or more processors, for display at the display device, the information such that at least a first portion of the information is obscured.

2. The method of claim 1, further comprising:
   determining, by the one or more processors, an estimated distance between the display device and the individual not associated with the currently active user account; and
   determining, by the one or more processors, based on the estimated distance, the threshold speed.

3. The method of claim 2, wherein the threshold speed is inversely proportional to the estimated distance between the display device and the individual not associated with the currently active user account.

4. The method of claim 1, further comprising:
   determining, by the one or more processors, based at least in part on the determined privacy level, an obfuscation level for the first portion of the information,
   wherein outputting the first portion of the information comprises outputting, by the one or more processors, the first portion of the information based on the obfuscation level for the first portion of the information.

5. The method of claim 4, further comprising:
   determining, by the one or more processors, based at least in part on the determined privacy level, an obfuscation level for at least a third portion of the information, wherein the obfuscation level for the first portion of the information is different than the obfuscation level for the third portion of the information; and
   outputting, by the one or more processors, for display at the display device, based on the obfuscation level for the third portion of the information, the third portion of the information such that the third portion of the information is obscured in a manner different compared to how the first portion of the information is obscured.

6. The method of claim 1, wherein the threshold privacy level is based on a location of the computing device.

7. The method of claim 1, further comprising:
   after outputting the first portion of the information, receiving, by the one or more processors, an indication of a user input selecting the first portion of the information;
   determining, by the one or more processors, that the user input corresponds to a command to display the first portion of information without obscuring the first portion of information; and
   outputting, by the one or more processors, the first portion of the information such that the first portion of information is no longer obscured.

8. The method of claim 1, further comprising:
   outputting, by the one or more processors, the first portion of the information such that the first portion of the information is not obscured; and
   after outputting the first portion of the information such that the first portion of the information is not obscured, determining, by the one or more processors, an amount of elapsed time since outputting the first portion of the information,
   wherein outputting the first portion of the information such that the first portion of the information is obscured is responsive to determining the amount of elapsed time satisfies a threshold amount of time.

9. The method of claim 1, wherein determining the estimated speed of the individual not associated with the currently active user account includes determining a first estimated speed of the individual at a first time, the method further comprising:
   determining, by the one or more processors, based at least in part on the sensor data, at a second time, a second estimated speed of the individual not associated with the currently active user account relative to the display device;

determining, by the one or more processors, that the second estimated speed does not satisfy the threshold speed; and outputting, by the one or more processors, for display at the display device, at least a second portion of the information.

10. A computing device comprising:

at least one processor; and a memory comprising instructions that, when executed by the at least one processor, cause the at least one processor to:
  determine, based at least in part on a type of information to be displayed at a display device associated with the computing device, a privacy level for the information to be displayed;
  determine whether the privacy level satisfies a threshold privacy level; and responsive to determining that the privacy level satisfies the threshold privacy level:
    determine, based on sensor data generated by at least one sensor associated with the computing device, whether an individual not associated with a currently active user account of the computing device is proximate to the display device;
    responsive to determining the individual not associated with the currently active user account is proximate to the display device:
      determine, based at least in part on the sensor data, an estimated speed of the individual not associated with the currently active user account relative to the display device;
      determine whether the estimated speed satisfies a threshold speed;
      responsive to determining that the estimated speed satisfies the threshold speed, output, for display at the display device, the information such that at least a first portion of the information is obscured; and
      responsive to determining that the estimated speed does not satisfy the threshold speed, output, for display at the display device, the information.

11. The computing device of claim 10, wherein the instructions further cause the at least one processor to:
  determine an estimated distance between the display device and the individual not associated with the currently active user account; and
  determine based on the estimated distance, the threshold speed.

12. The computing device of claim 11, wherein the threshold speed is inversely proportional to the estimated distance between the display device and the individual not associated with the currently active user account.

13. The computing device of claim 10, wherein the instructions further cause the at least one processor to:
  responsive to determining that the privacy level does not satisfy the threshold privacy level, output, for display at the display device, the information.

14. The computing device of claim 10, wherein the instructions further cause the at least one processor to:
  determine, based at least in part on the determined privacy level, an obfuscation level for the first portion of the information, and
  output the first portion of the information based on the obfuscation level for the first portion of the information.

15. The computing device of claim 14, wherein the instructions further cause the at least one processor to:
  determine, based at least in part on the determined privacy level, an obfuscation level for at least a third portion of the information, wherein the obfuscation level for the first portion of the information is different than the obfuscation level for the third portion of the information; and
  output, for display at the display device, based on the obfuscation level for the third portion of the information, the third portion of the information such that the third portion of the information is obscured in a manner different compared to how the first portion of the information is obscured.

16. The computing device of claim 10, wherein the threshold privacy level is based on a location of the computing device.

17. The computing device of claim 10, wherein the instructions further cause the at least one processor to:
  after outputting the first portion of the information, receive an indication of a user input selecting the first portion of the information;
  determine that the user input corresponds to a command to display the first portion of information without obscuring the first portion of information; and
  output the first portion of the information such that the first portion of information is no longer obscured.

18. The computing device of claim 10, wherein the instructions further cause the at least one processor to:
  further responsive to determining that the estimated speed satisfies the threshold speed:
    output the first portion of the information such that the first portion of the information is not obscured; and
    after outputting the first portion of the information such that the first portion of the information is not obscured, determining an amount of elapsed time since outputting the first portion of the information,
    output the first portion of the information such that the first portion of the information is obscured in further response to determining the amount of elapsed time satisfies a threshold amount of time.

19. A non-transitory computer-readable storage medium encoded with instructions that, when executed by at least one processor of a computing device, cause the at least one processor to:
  determine, based at least in part on a type of information to be displayed at a display device associated with the computing device, a privacy level for the information to be displayed;
  determine whether the privacy level satisfies a threshold privacy level; and
  responsive to determining that the privacy level satisfies the threshold privacy level:
    determine, based on sensor data generated by at least one sensor associated with the computing device, whether an individual not associated with a currently active user account of the computing device is proximate to the display device;
    responsive to determining the individual not associated with the currently active user account is proximate to the display device:
      determine, based at least in part on the sensor data, an estimated speed of the individual not associated with the currently active user account relative to the display device;
      determine whether the estimated speed satisfies a threshold speed;

responsive to determining that the estimated speed satisfies the threshold speed, output, for display at the display device, the information such that at least a first portion of the information is obscured; and responsive to determining that the estimated speed does not satisfy the threshold speed, output, for display at the display device, the information.

\* \* \* \* \*